US012592174B2

(12) United States Patent
Zhao et al.

(10) Patent No.: US 12,592,174 B2
(45) Date of Patent: Mar. 31, 2026

(54) DRIVING CIRCUITRY, DRIVING METHOD, DISPLAY SUBSTRATE AND DISPLAY DEVICE

(71) Applicant: BOE TECHNOLOGY GROUP CO., LTD., Beijing (CN)

(72) Inventors: Donghui Zhao, Beijing (CN); Pan Xu, Beijing (CN); Ying Han, Beijing (CN); Xing Zhang, Beijing (CN); Chengyuan Luo, Beijing (CN); Guangshuang Lv, Beijing (CN); Xing Yao, Beijing (CN); Dandan Zhou, Beijing (CN); Miao Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 122 days.

(21) Appl. No.: 18/556,639

(22) PCT Filed: Nov. 25, 2022

(86) PCT No.: PCT/CN2022/134332

§ 371 (c)(1),
(2) Date: Oct. 20, 2023

(87) PCT Pub. No.: WO2024/108544

PCT Pub. Date: May 30, 2024

(65) Prior Publication Data

US 2025/0279028 A1 Sep. 4, 2025

(51) Int. Cl.
*G09G 3/20* (2006.01)

(52) U.S. Cl.
CPC ... *G09G 3/2092* (2013.01); *G09G 2300/0408* (2013.01); *G09G 2310/0267* (2013.01);
(Continued)

(58) Field of Classification Search
CPC ......... G09G 3/2092; G09G 2300/0408; G09G 2310/0267; G09G 2310/0286; G09G 2320/0214; G09G 3/3266; G11C 19/28
See application file for complete search history.

(56) References Cited

U.S. PATENT DOCUMENTS

2016/0266699 A1* 9/2016 Zhao .................... G09G 3/3677
2017/0032752 A1* 2/2017 Huang .................. G11C 19/28
(Continued)

FOREIGN PATENT DOCUMENTS

CN 104021769 A 9/2014
CN 104485079 A 4/2015
(Continued)

OTHER PUBLICATIONS

European Patent Office, Extended European Search Report Issued in Application No. 22966233.3, Mar. 4, 2025, Germany, 9 pages.
(Continued)

*Primary Examiner* — Jose R Soto Lopez
(74) *Attorney, Agent, or Firm* — McCoy Russell LLP

(57) ABSTRACT

The present disclosure provides a driving circuitry, a driving method, a display substrate and a display device. The driving circuitry includes a driving output circuitry, a first resetting circuitry and a first isolation circuitry. The driving output circuitry is configured to control a driving signal output end to be electrically coupled to a first voltage line or a first clock signal line under the control of a potential at a first node. The first resetting circuitry is configured to control a first clock signal line to write a first clock signal into a first control node under the control of a first resetting signal. The first isolation circuitry is configured to control the first control node to be electrically coupled to the first node under the control of a second clock signal.

20 Claims, 15 Drawing Sheets

(52) U.S. Cl.
CPC ............... *G09G 2310/0286* (2013.01); *G09G 2320/0214* (2013.01)

(56) References Cited

U.S. PATENT DOCUMENTS

| | | | | |
|---|---|---|---|---|
| 2018/0121023 | A1* | 5/2018 | Kim | G06F 3/04184 |
| 2020/0051507 | A1* | 2/2020 | Feng | G11C 19/28 |
| 2020/0273503 | A1* | 8/2020 | Wang | G09G 3/3677 |
| 2021/0193025 | A1* | 6/2021 | Xu | G09G 3/3266 |
| 2021/0295764 | A1* | 9/2021 | Lin | G09G 3/2096 |
| 2022/0068212 | A1* | 3/2022 | Yao | H10K 59/126 |
| 2022/0246101 | A1* | 8/2022 | Long | G09G 3/3225 |
| 2022/0319374 | A1* | 10/2022 | Xu | G09G 3/20 |
| 2023/0084070 | A1* | 3/2023 | Feng | G09G 3/20 345/204 |
| 2023/0169917 | A1 | 6/2023 | Xiao et al. | |

FOREIGN PATENT DOCUMENTS

| | | | |
|---|---|---|---|
| CN | 104992661 | A | 10/2015 |
| CN | 108711401 | A | 10/2018 |
| CN | 109285505 | A | 1/2019 |
| CN | 111445832 | A | 7/2020 |
| CN | 214541584 | U | 10/2021 |
| CN | 113903309 | A | 1/2022 |
| CN | 114945969 | A | 8/2022 |
| KR | 20180095428 | A | 8/2018 |
| WO | 2021227766 | A1 | 11/2021 |
| WO | 2022188019 | A1 | 9/2022 |

OTHER PUBLICATIONS

European Patent Office, Office Action Issued in Application No. 22966233.3, Dec. 2, 2025, Germany, 8 pages.

* cited by examiner

DRIVING CIRCUITRY, DRIVING METHOD, DISPLAY SUBSTRATE AND DISPLAY DEVICE

CROSS REFERENCE TO RELATED APPLICATION

This application is the U.S. national phase of PCT Application No. PCT/CN2022/134332 filed on Nov. 25, 2022, the entire contents of which are hereby incorporated by reference.

TECHNICAL FIELD

The present disclosure relates to the field of display technology, in particular to a driving circuitry, a driving method, a display substrate, and a display device.

BACKGROUND

In the related art, in a driving circuitry, a potential at a first node is directly reset by a resetting transistor under the effect of a cut-off voltage signal (a cut-off voltage is, e.g., a low voltage). Negative drift easily occurs for a threshold voltage of a transistor (e.g., an oxide transistor), so when the resetting transistor needs to be cut off, it is cut off incompletely. At this time, a current leakage occurs due to a passage between a low voltage line and the first node, and the potential at the first node is pulled down, so an output of the driving circuitry is abnormal.

SUMMARY

In one aspect, the present disclosure provides in some embodiments a driving circuitry, including a driving output circuitry, a first resetting circuitry and a first isolation circuitry. The driving output circuitry is electrically coupled to a first node and a driving signal output end, electrically coupled to a first voltage line or a first clock signal line, and configured to control the driving signal output end to be electrically coupled to the first voltage line or the first clock signal line under the control of a potential at the first node. The first resetting circuitry is electrically coupled to a first resetting line, the first clock signal line and a first control node, and configured to control the first clock signal line to write a first clock signal into the first control node under the control of a first resetting signal from the first resetting line. The first isolation circuitry is electrically coupled to a second clock signal line, the first control node and the first node, and configured to control the first control node to be electrically coupled to the first node under the control of a second clock signal from the second clock signal line.

In a possible embodiment of the present disclosure, the first resetting circuitry includes a first transistor, a gate electrode of the first transistor is electrically coupled to the first resetting line, a first electrode of the first transistor is electrically coupled to the first clock signal line, and a second electrode of the first transistor is electrically coupled to the first control node.

In a possible embodiment of the present disclosure, the first transistor is an oxide thin film transistor, a first high voltage time period does not overlap with a second high voltage time period, the first high voltage time period is a time period within which a potential of the first clock signal is a high voltage, and the second high voltage time period is a time period within which a potential of the second clock signal is a high voltage.

In a possible embodiment of the present disclosure, the driving circuitry further includes a second control node control circuitry coupled to the first clock signal line, the first voltage line, a second control node, a third node and the second clock signal line, and configured to control the second control node to be electrically coupled to the first voltage line under the control of the first clock signal, and control the third node to be electrically coupled to the second clock signal line under the control of a potential at the second control node.

In a possible embodiment of the present disclosure, the second control node control circuitry is further configured to control the potential at the second control node in accordance with a potential at the third node.

In a possible embodiment of the present disclosure, the driving circuitry further includes a cascading output circuitry and a cascading resetting circuitry, the cascading output circuitry is electrically coupled to the first node, a carry output end and the first voltage line, and configured to control the carry output end to be electrically coupled to the first voltage line under the control of the potential at the first node, and the cascading resetting circuitry is electrically coupled to a second node, the carry output end and a second voltage line, and configured to control the carry output end to be electrically coupled to the second voltage line under the control of a potential at the second node.

In a possible embodiment of the present disclosure, the cascading resetting circuitry includes a second transistor and a third transistor. A gate electrode of the second transistor is electrically coupled to the second node, a first electrode of the second transistor is electrically coupled to the carry output end, and a second electrode of the second transistor is electrically coupled to a fourth node. A gate electrode of the third transistor is electrically coupled to the second node, a first electrode of the third transistor is electrically coupled to the fourth node, and a second electrode of the third transistor is electrically coupled to the second voltage line.

In a possible embodiment of the present disclosure, the driving circuitry further includes a first control circuitry electrically coupled to the first node, a third voltage line and the fourth node, and configured to control the third voltage line to be electrically coupled to the fourth node under the control of the potential at the first node.

In a possible embodiment of the present disclosure, the first control circuitry includes a fourth transistor, a gate electrode of the fourth transistor is electrically coupled to the first node, a first electrode of the fourth transistor is electrically coupled to the third voltage line, and a second electrode of the fourth transistor is electrically coupled to the fourth node.

In a possible embodiment of the present disclosure, the driving circuitry further includes a driving output resetting circuitry and a second resetting circuitry. The output resetting circuitry is electrically coupled to the second node, the driving signal output end and a fourth voltage line, and configured to control the driving signal output end to be electrically coupled to the fourth voltage line under the control of the potential at the second node. The second resetting circuitry is electrically coupled to the first node, the second voltage line and the second node, and configured to control the second voltage line to be electrically coupled to the second node under the control of the potential at the first node.

In a possible embodiment of the present disclosure, a transistor in the output resetting circuitry is an oxide transistor, and a voltage value of a second voltage signal from the second voltage line is less than a voltage value of a first voltage signal from the first voltage line.

In a possible embodiment of the present disclosure, the output resetting circuitry includes a fifth transistor and a first capacitor, and the second resetting circuitry includes a sixth transistor. A gate electrode of the fifth transistor is electrically coupled to the second node, a first electrode of the fifth transistor is electrically coupled to the driving signal output end, and a second electrode of the fifth transistor is electrically coupled to the fourth voltage line. A first end of the first capacitor is electrically coupled to the second node, and a second end of the first capacitor is electrically coupled to the fourth voltage line. A gate electrode of the sixth transistor is electrically coupled to the first node, a first electrode of the sixth transistor is electrically coupled to the second voltage line, and a second electrode of the sixth transistor is electrically coupled to the second node.

In a possible embodiment of the present disclosure, the driving circuitry further includes a second control circuitry electrically coupled to the first control node, the second clock signal line, the second voltage line and the second control node, and configured to control the first control node to be electrically coupled to the second voltage line under the control of the potential at the second control node and the second clock signal from the second clock signal line.

In a possible embodiment of the present disclosure, the driving circuitry further includes a third control circuitry electrically coupled to the second clock signal line, an input line and the first control node, and configured to control the input line to be electrically coupled to the first control node under the control of the second clock signal.

In a possible embodiment of the present disclosure, the driving circuitry further includes a fourth control circuitry electrically coupled to the first node, the first control node and the third voltage line, and configured to control the first control node to be electrically coupled to the third voltage line under the control of the potential at the first node.

In a possible embodiment of the present disclosure, the second control node control circuitry is further electrically coupled to the input line, and configured to write the first clock signal into the second control node under the control of an input signal from the input line.

In a possible embodiment of the present disclosure, the second control node control circuitry includes a seventh transistor and an eighth transistor. A gate electrode of the seventh transistor is electrically coupled to the input line, a first electrode of the seventh transistor is electrically coupled to the first clock signal line, and a second electrode of the seventh transistor is electrically coupled to a first electrode of the eighth transistor. A gate electrode of the eighth transistor is electrically coupled to the input line, and a second electrode of the eighth transistor is electrically coupled to the second control node.

In a possible embodiment of the present disclosure, the driving circuitry further includes a third resetting circuitry electrically coupled to the second resetting line, the third voltage line, and the second node, and configured to control the third voltage line to be electrically coupled to the second node under the control of a second resetting signal from the second resetting line.

In a possible embodiment of the present disclosure, the third resetting circuitry includes a ninth transistor and a tenth transistor. A gate electrode of the ninth transistor is electrically coupled to the second resetting line, a first electrode of the ninth transistor is electrically coupled to the third voltage line, and a second electrode of the ninth transistor is electrically coupled to a first electrode of the tenth transistor. A gate electrode of the tenth transistor is electrically coupled to the second resetting line, and a second electrode of the tenth transistor is electrically coupled to the second node.

In a possible embodiment of the present disclosure, the driving circuitry further includes a second isolation circuitry electrically coupled to the second clock signal line, the third node and the second node, and configured to control the third node to be electrically coupled to the second node under the control of a second clock signal from the second clock signal line.

In a possible embodiment of the present disclosure, the third control circuitry includes an eleventh transistor, the second control circuitry includes a twelfth transistor and a thirteenth transistor, and the fourth control circuitry includes a fourteenth transistor. A gate electrode of the eleventh transistor is electrically coupled to the second clock signal line, a first electrode of the eleventh transistor is electrically coupled to the input line, and a second electrode of the eleventh transistor is electrically coupled to the first control node. A gate electrode of the fourteenth transistor is electrically coupled to the first node, a first electrode of the fourteenth transistor is electrically coupled to a third voltage line, and a second electrode of the fourteenth transistor is electrically coupled to the first control node. A gate electrode of the twelfth transistor is electrically coupled to the second clock signal line, a first electrode of the twelfth transistor is electrically coupled to the first control node, a second electrode of the twelfth transistor is electrically coupled to a first electrode of the thirteenth transistor, a gate electrode of the thirteenth transistor is electrically coupled to the second control node, and a second electrode of the thirteenth transistor is electrically coupled to the second voltage line, or the gate electrode of the twelfth transistor is electrically coupled to the second control node, the first electrode of the twelfth transistor is electrically coupled to the first control node, the second electrode of the twelfth transistor is electrically coupled to the first electrode of the thirteenth transistor, the gate electrode of the thirteenth transistor is electrically coupled to the second clock signal line, and the second electrode of the thirteenth transistor is electrically coupled to the second voltage line.

In a possible embodiment of the present disclosure, the driving output circuitry includes a fifteenth transistor and a second capacitor, and the first isolation circuitry includes a sixteenth transistor. A gate electrode of the fifteenth transistor is electrically coupled to the first node, a first electrode of the fifteenth transistor is electrically coupled to the first voltage line or the first clock signal line, and a second electrode of the fifteenth transistor is electrically coupled to the driving signal output end. A first end of the second capacitor is electrically coupled to the first node, and a second end of the second capacitor is electrically coupled to the driving signal output end. A control electrode of the sixteenth transistor is electrically coupled to the second clock signal line, a first electrode of the sixteenth transistor is electrically coupled to the first control node, and a second electrode of the sixteenth transistor is electrically coupled to the first node.

In a possible embodiment of the present disclosure, the second control node control circuitry includes a seventeenth transistor, a third capacitor and an eighteenth transistor. A gate electrode of the seventeenth transistor is electrically coupled to the first clock signal line, a first electrode of the seventeenth transistor is electrically coupled to the first voltage line, and a second electrode of the seventeenth transistor is electrically coupled to the second control node. A first end of the third capacitor is electrically coupled to the second control node, and a second end of the third capacitor is electrically coupled to the third node. A gate electrode of the eighteenth transistor is electrically coupled to the second control node, a first electrode of the eighteenth transistor is electrically coupled to the second clock signal line, and a second electrode of the eighteenth transistor is electrically coupled to the third node.

In a possible embodiment of the present disclosure, the cascading output circuitry includes a nineteenth transistor, a gate electrode of the nineteenth transistor is electrically coupled to the first node, a first electrode of the nineteenth transistor is electrically coupled to the first voltage line, and a second electrode of the nineteenth transistor is electrically coupled to a cascading output end.

In a possible embodiment of the present disclosure, the cascading output circuitry further includes a fourth capacitor, a first end of the fourth capacitor is electrically coupled to the first node, and a second end of the fourth capacitor is electrically coupled to the cascading output end.

In a possible embodiment of the present disclosure, the second isolation circuitry includes a twentieth transistor, a gate electrode of the twentieth transistor is electrically coupled to the second clock signal line, a first electrode of the twentieth transistor is electrically coupled to the third node, and a second electrode of the twentieth transistor is electrically coupled to the second node.

In a possible embodiment of the present disclosure, the driving circuitry further includes a twenty-first transistor, a gate electrode of the twenty-first transistor is electrically coupled to the first high voltage line, a first electrode of the twenty-first transistor is electrically coupled to the second electrode of the sixteenth transistor, and a second electrode of the twenty-first transistor is electrically coupled to the first node.

In another aspect, the present disclosure provides in some embodiments a driving method for the above-mentioned driving circuitry, a display period including a first phase, a second phase and a third phase arranged one after another, the driving method including: within the first phase, controlling, by the first resetting circuitry, the first clock signal line to write the first clock signal into the first control node under the control of the first resetting signal from the first resetting line, and when the second clock signal line provides a high voltage signal, controlling, by the first isolation circuitry, the first control node to be electrically coupled to the first node under the control of the second clock signal from the second clock signal line; within the second phase, when the second clock signal line provides a high voltage signal, controlling, by the first isolation circuitry, the first control node to be electrically coupled to the first node under the control of the second clock signal, and controlling, by the driving output circuitry, the driving signal output end to be electrically coupled to the first voltage line under the control of the potential at the first node; and within the third phase, when the second clock signal line provides a high voltage signal, controlling, by the first isolation circuitry, the first control node to be electrically coupled to the first node under the control of the second clock signal.

In yet another aspect, the present disclosure provides in some embodiments a display substrate including the above-mentioned driving circuitry.

In a possible embodiment of the present disclosure, the display substrate further includes a plurality of direct-current signal lines arranged in columns, a display region and a peripheral region, and the direct-current signal lines and the driving circuitry are arranged in the peripheral region. The direct-current signal lines in at least one column are arranged on a side of the driving circuitry away from the display region, and the direct-current signal lines other than the direct-current signal lines in the at least one column are arranged on a side of the driving circuitry close to the display region.

In still yet another aspect, the present disclosure provides in some embodiments a display device including the above-mentioned display substrate.

DETAILED DESCRIPTION

Figure 1:
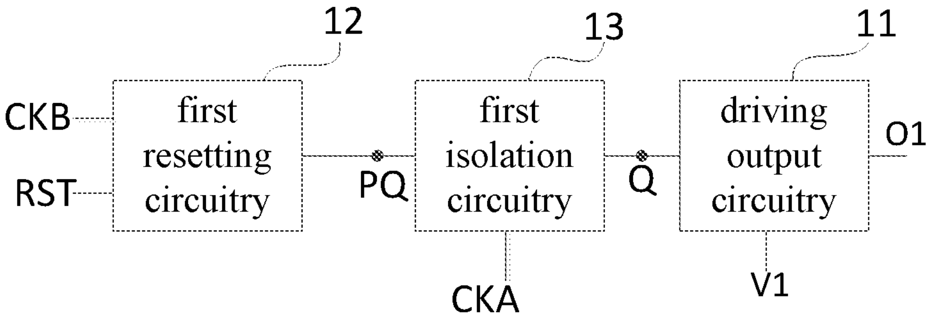
FIG. 1 is a schematic view showing a driving circuitry according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be TFTs, field effect transistors (FETs) or any other elements having an identical characteristic. In order to differentiate two electrodes other than a gate electrode from each other, one of the two electrodes is called as first electrode and the other is called as second electrode.

In actual use, when the transistor is a TFT or FET, the first electrode may be a drain electrode and the second electrode may be a source electrode, or the first electrode may be a source electrode and the second electrode may be a drain electrode.

The present disclosure provides in some embodiments a driving circuitry, which includes a driving output circuitry, a first resetting circuitry and a first isolation circuitry. The driving output circuitry is electrically coupled to a first node and a driving signal output end, electrically coupled to a first voltage line or a first clock signal line, and configured to control the driving signal output end to be electrically coupled to the first voltage line or the first clock signal line under the control of a potential at the first node. The first resetting circuitry is electrically coupled to a first resetting line, the first clock signal line and a first control node, and configured to control the first clock signal line to write a first clock signal into the first control node under the control of a first resetting signal from the first resetting line. The first isolation circuitry is electrically coupled to a second clock signal line, the first control node and the first node, and configured to control the first control node to be electrically coupled to the first node under the control of a second clock signal from the second clock signal line.

According to the embodiments of the present disclosure, the driving circuitry includes the first resetting circuitry and the first isolation circuitry, the first setting circuitry is configured to write the first clock signal into the first control node under the control of the resetting signal, and the first isolation circuitry is configured to control the first control node to be electrically coupled to the first node under the control of the second clock signal. The potential at the first control node is reset through the first clock signal, and then the first control node is controlled by the first isolation circuitry to be electrically coupled to the first node under the control of the second clock signal, so as to reset the potential at the first node. The first clock signal is a periodic signal, so it is able to shorten a low-voltage time period and reduce a leakage current.

In at least one embodiment of the present disclosure, the first resetting line is but not limited to, a resetting line RST.

As shown in FIG. 1, the driving circuitry includes a driving output circuitry 11, a first resetting circuitry 12 and a first isolation circuitry 13. The driving output circuitry 11 is electrically coupled to a first node Q, a driving signal output end O1 and a first voltage line V1, and configured to control the driving signal output end O1 to be electrically coupled to the first voltage line V1 under the control of the potential at the first node Q. The first resetting circuitry 12 is electrically coupled to a resetting line RST, a first clock signal line CKB and a first control node PQ, and configured to control the first clock signal line CKB to write the first clock signal into the first control node PQ under the control of the resetting signal from the resetting line RST. The first isolation circuitry 13 is electrically coupled to a second clock signal line CKA, a first control node PQ and a first node Q, and configured to control the first control node PQ to be electrically coupled to the first node Q under the control of a second clock signal from the second clock signal line CKA.

In at least one embodiment of the present disclosure, the driving circuitry is an oxide internal compensation Pulse Width Modulation (PWM) circuitry.

In at least one embodiment of the present disclosure, the driving circuitry includes, but not limited to, an oxide transistor.

According to the embodiments of the present disclosure, the driving circuitry includes the first resetting circuitry 12 and the first isolation circuitry 13, the first setting circuitry 12 is configured to write the first clock signal into the first control node PQ under the control of the resetting signal, and the first isolation circuitry 13 is configured to control the first control node PQ to be electrically coupled to the first node Q under the control of the second clock signal. The potential at the first control node PQ is reset through the first clock signal, and then the first control node PQ is controlled by the first isolation circuitry 13 to be electrically coupled to the first node Q under the control of the second clock signal, so as to reset the potential at the first node Q. The first clock signal is a periodic signal, so it is able to shorten a low-voltage time period and reduce a leakage current.

In the related art, a potential at a first node is directly reset by a resetting transistor under the effect of a low voltage signal. Negative drift easily occurs for a threshold voltage of an oxide transistor, so when the resetting transistor needs to be cut off, it is cut off incompletely. At this time, a current leakage occurs due to a passage between a low voltage line and the first node, and the potential at the first node is pulled down. However, in the embodiments of the present disclosure, the potential at the first control node is reset through the first clock signal, and the first control node is controlled by the first isolation circuitry to be electrically coupled to the first node under the control of the second clock signal, so as to reset the potential at the first node.

In a possible embodiment of the present disclosure, the first resetting circuitry includes a first transistor, a gate electrode of the first transistor is electrically coupled to the first resetting line, a first electrode of the first transistor is electrically coupled to the first clock signal line, and a second electrode of the first transistor is electrically coupled to the first control node.

In at least one embodiment of the present disclosure, the first transistor is an oxide thin-film transistor, a first high voltage time period does not overlap with a second high voltage time period, the first high voltage time period is a time period within which a potential of the first clock signal is a high voltage, and the second high voltage time period is a time period within which a potential of the second clock signal is a high voltage.

The driving circuitry in the embodiments of the present disclosure further includes a second control node control circuitry electrically coupled to the first clock signal line, the first voltage line, a second control node, a third node and the second clock signal line, and configured to control the second control node to be electrically coupled to the first voltage line under the control of the first clock signal, control the third node to be electrically coupled to the second clock signal line under the control of a potential at the second control node, and control the potential at the second control node in accordance with a potential at the third node.

During the implementation, the driving circuitry further includes the second control node control circuitry, and the potential at the second control node is controlled by the second control node control circuitry in accordance with the second clock signal under the control of the first clock signal.

Figure 2:
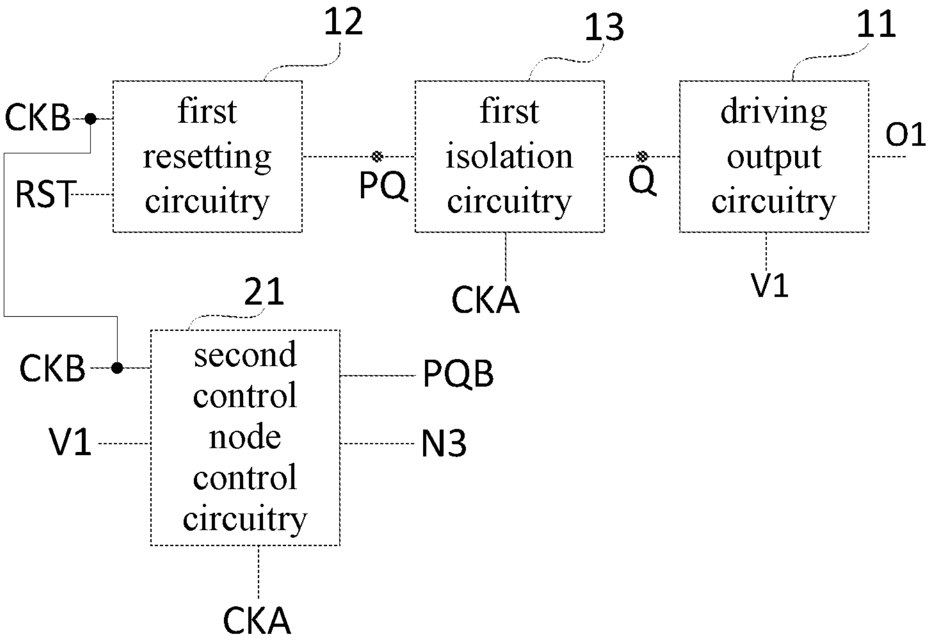
FIG. 2 is another schematic view showing the driving circuitry according to one embodiment of the present disclosure.

As shown in FIG. 2, on the basis of the driving circuitry in FIG. 1, the driving circuitry further includes a second control node control circuitry 21 electrically coupled to the first clock signal line CKB, the first voltage line V1, a second control node PQB, a third node N3 and the second clock signal line CKA, and configured to control the second control node PQB to be electrically coupled to the first voltage line V1 under the control of the first clock signal, and control the third node N3 to be electrically coupled to the second clock signal line CKA under the control of the potential at the second control node PQB.

In at least one embodiment of the present disclosure, the second control node control circuitry 21 controls the potential at the second control node PQB in accordance with the potential of the third node N3. At this time, the second control node control circuitry 21 includes a capacitor, a first end of which is electrically coupled to the third node N3 and a second end of which is electrically coupled to the second clock signal line CKA, so as to control the potential at the second control node PQB in accordance with the potential at the third node N3.

In at least one embodiment of the present disclosure, the first voltage line is, but not limited to, a first high voltage line.

The driving circuitry in the embodiments of the present disclosure further includes a cascading output circuitry and a cascading resetting circuitry (T12 and T13). The cascading output circuitry is electrically coupled to the first node, a carry output end and the first voltage line, and configured to control the carry output end to be electrically coupled to the first voltage line under the control of the potential at the first node. The cascading resetting circuitry is electrically coupled to a second node, the carry output end and a second voltage line, and configured to control the carry output end to be electrically coupled to the second voltage line under the control of a potential at the second node.

During the implementation, the driving circuitry further includes the cascading output circuitry and the cascading resetting circuitry, and the carry output end is notified through the cascading output circuitry and the cascading resetting circuitry to output a carry signal for cascading, so as to enhance the driving capability of the driving circuitry.

Figure 3:
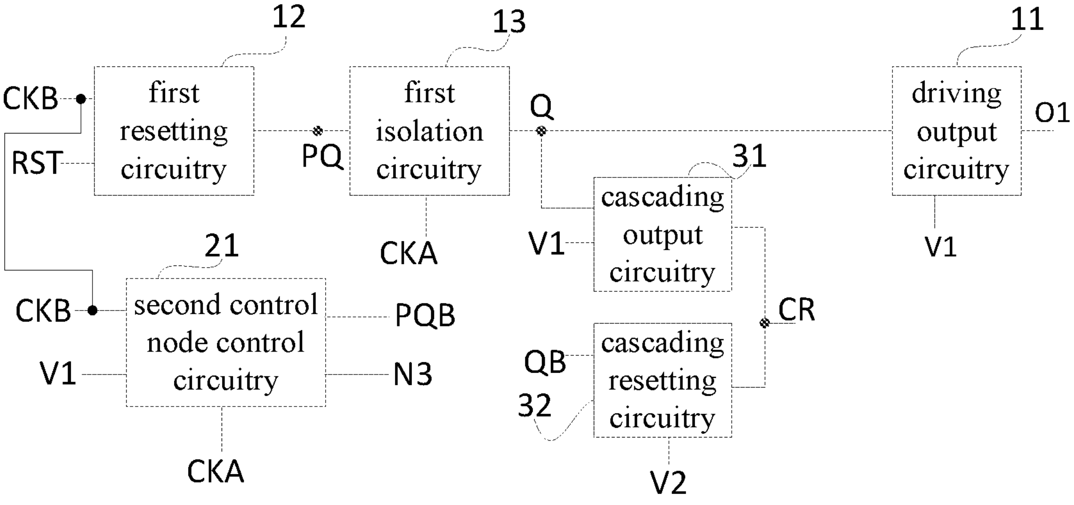
FIG. 3 is yet another schematic view showing the driving circuitry according to one embodiment of the present disclosure.

As shown in FIG. 3, on the basis of the driving circuitry in FIG. 2, the driving circuitry further includes a cascading output circuitry 31 and a cascading resetting circuitry 32. The cascading output circuitry 31 is electrically coupled to the first node Q, the carry output end CR and the first voltage line V1, and configured to control the carry output end C4 to be electrically coupled to the first voltage line V1 under the control of the potential at the first node Q. The cascading resetting circuitry 32 is electrically coupled to a second node QB, the carry output end CR and a second voltage line V2, and configured to control the carry output end CR to be electrically coupled to the second voltage line V2 under the control of the potential at the second node QB.

In at least one embodiment of the present disclosure, the first voltage line V1 is, but not limited to, a first high voltage line and the second voltage line V2 is, but not limited to, a second low voltage line.

In a possible embodiment of the present disclosure, the cascading resetting circuitry includes a second transistor and a third transistor. A gate electrode of the second transistor is electrically coupled to the second node, a first electrode of the second transistor is electrically coupled to the carry output end, and a second electrode of the second transistor is electrically coupled to a fourth node. A gate electrode of the third transistor is electrically coupled to the second node, a first electrode of the third transistor is electrically coupled to the fourth node, and a second electrode of the third transistor is electrically coupled to the second voltage line.

The driving circuitry in the embodiments of the present disclosure further includes a first control circuitry electrically coupled to the first node, a third voltage line and the fourth node, and configured to control the third voltage line to be electrically coupled to the fourth node under the control of the potential at the first node.

In at least one embodiment of the present disclosure, the third voltage line is, but not limited to, a second high voltage line.

During the implementation, the driving circuitry further includes the first control circuitry, and the fourth node is controlled by the first control circuitry to be electrically coupled to the third voltage line under the control of the potential at the first node, so as to prevent the potential of the carry signal at the carry output end from decreasing due to the current leakage.

Figure 4:
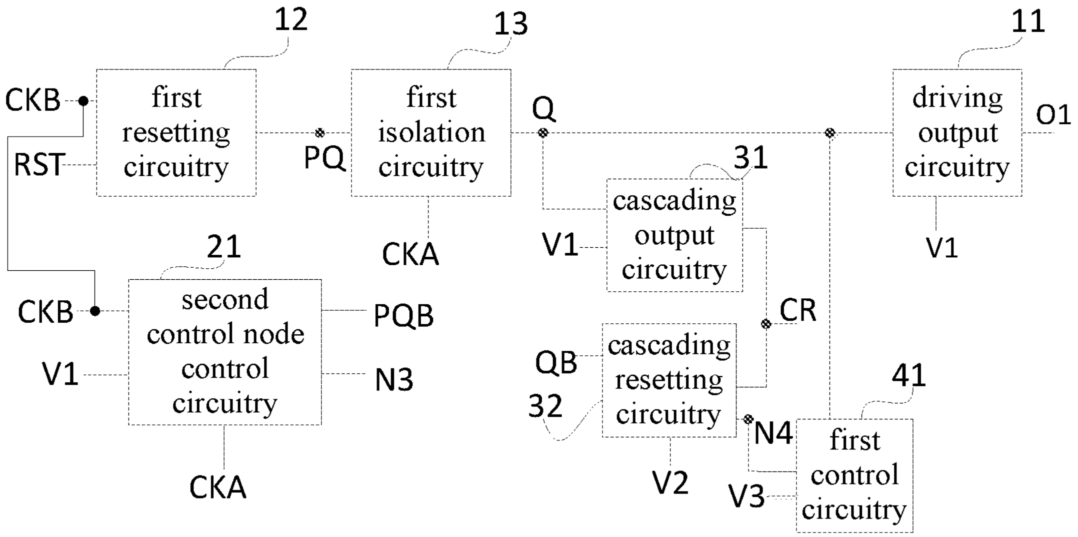
FIG. 4 is still yet another schematic view showing the driving circuitry according to one embodiment of the present disclosure.

As shown in FIG. 4, on the basis of the driving circuitry in FIG. 3, the driving circuitry further includes a first control circuitry 41 electrically coupled to the first node Q, a third voltage line V3 and the fourth node N4, and configured to control the third voltage line V3 to be electrically coupled to the fourth node N4 under the control of the potential at the first node Q. The cascading resetting circuitry 32 is electrically coupled to the fourth node N4.

In a possible embodiment of the present disclosure, the first control circuitry includes a fourth transistor, a gate electrode of the fourth transistor is electrically coupled to the first node, a first electrode of the fourth transistor is electrically coupled to the third voltage line, and a second electrode of the fourth transistor is electrically coupled to the fourth node.

Figure 5:
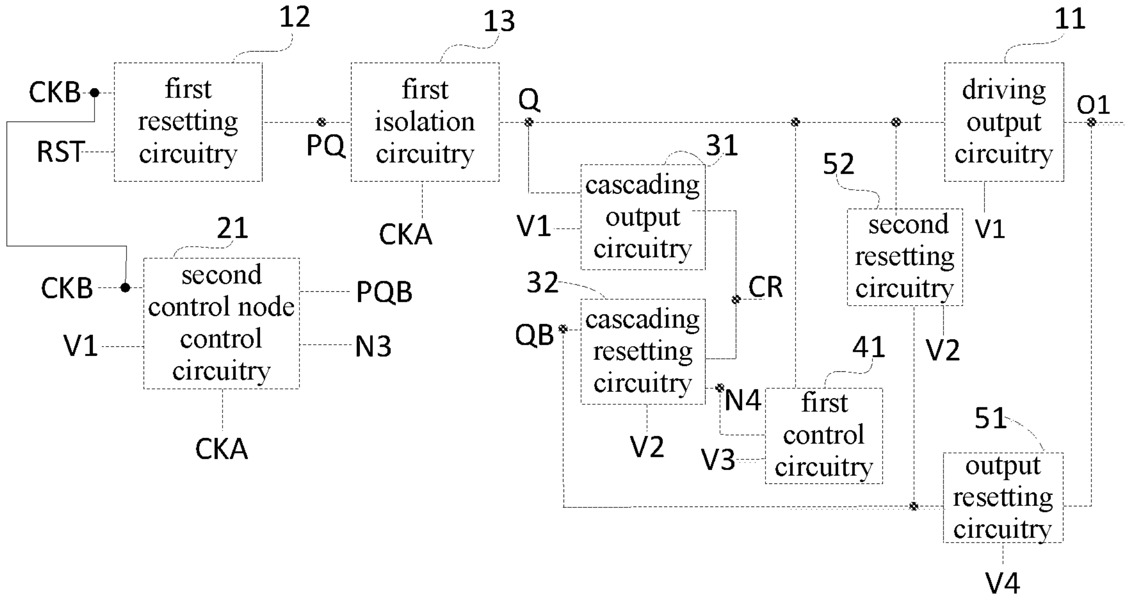
FIG. 5 is still yet another schematic view showing the driving circuitry according to one embodiment of the present disclosure.

As shown in FIG. 5, on the basis of the driving circuitry in FIG. 4, the driving circuitry further includes a driving output resetting circuitry 51 and a second resetting circuitry 52. The output resetting circuitry 51 is electrically coupled to the second node QB, the driving signal output end O1 and the fourth voltage line V4, and configured to control the driving signal output end O1 to be electrically coupled to the fourth voltage line V4 under the control of the potential at the second node QB. The second resetting circuitry 52 is electrically coupled to the first node Q, the second voltage line V2 and the second node QB, and configured to control the second voltage line V2 to be electrically coupled to the second node QB under the control of the potential at the first node Q.

In at least one embodiment of the present disclosure, the fourth voltage line is, but not limited to, a first low voltage line and the second voltage line is, but not limited to, a second low voltage line.

During the operation of the driving circuitry in FIG. 5, the second resetting circuitry 52 controls the second node QB to be electrically coupled to the second voltage line V2 under the control of the potential at the first node Q, and the output resetting circuitry 51 controls the driving signal output end O1 to be electrically coupled to the fourth voltage line V4 under the control of the potential at the second node QB.

In a possible embodiment of the present disclosure, a transistor in the output resetting circuitry is an oxide transistor, and a voltage value of a second voltage signal from the second voltage line is less than a voltage value of a first voltage signal from the first voltage line, so as to prevent the occurrence of a current leakage when negative drift occurs for a threshold voltage of the transistor in the output resetting circuitry.

In a possible embodiment of the present disclosure, the output resetting circuitry includes a fifth transistor and a first capacitor, and the second resetting circuitry includes a sixth transistor. A gate electrode of the fifth transistor is electrically coupled to the second node, a first electrode of the fifth transistor is electrically coupled to the driving signal output end, and a second electrode of the fifth transistor is electrically coupled to the fourth voltage line. A first end of the first capacitor is electrically coupled to the second node, and a second end of the first capacitor is electrically coupled to the fourth voltage line. A gate electrode of the sixth transistor is electrically coupled to the first node, a first electrode of the sixth transistor is electrically coupled to the second voltage line, and a second electrode of the sixth transistor is electrically coupled to the second node.

In a possible embodiment of the present disclosure, the driving circuitry further includes a second control circuitry electrically coupled to the first control node, the second clock signal line, the second voltage line and the second control node, and configured to control the first control node to be electrically coupled to the second voltage line under the control of the potential at the second control node and the second clock signal from the second clock signal line.

During the implementation, the driving circuitry includes the second control circuitry, and the first control node is controlled by the second control circuitry to be electrically coupled to the second voltage line under the control of the potential at the second control node and the second clock signal from the second clock signal line.

The driving circuitry in the embodiments of the present disclosure further includes a third control circuitry electrically coupled to the second clock signal line, an input line and the first control node, and configured to control the input line to be electrically coupled to the first control node under the control of the second clock signal.

During the implementation, the driving circuitry includes the third control circuitry, the input line is controlled by the third control circuitry to be electrically coupled to the first control node under the control of the second clock signal.

The driving circuitry in the embodiments of the present disclosure further includes a fourth control circuitry electrically coupled to the first node, the first control node and the third voltage line, and configured to control the first control node to be electrically coupled to the third voltage line under the control of the potential at the first node.

During the implementation, the driving circuitry includes the fourth control circuitry, and the first control node is controlled by the fourth control circuitry to be electrically coupled to the third voltage line under the control of the potential at the first node.

In at least one embodiment of the present disclosure, the second control node control circuitry is further electrically coupled to the input line and configured to write the first clock signal into the second control node under the control of an input signal from the input line.

During the implementation, the second control node control circuitry writes the first clock signal into the second control node under the control of the input signal.

In a possible embodiment of the present disclosure, the second control node control circuitry includes a seventh transistor and an eighth transistor. A gate electrode of the seventh transistor is electrically coupled to the input line, a first electrode of the seventh transistor is electrically coupled to the first clock signal line, and a second electrode of the seventh transistor is electrically coupled to a first electrode of the eighth transistor. A gate electrode of the eighth transistor is electrically coupled to the input line, and a second electrode of the eighth transistor is electrically coupled to the second control node.

The driving circuitry in the embodiments of the present disclosure further includes a third resetting circuitry electrically coupled to the second resetting line, the third voltage line, and the second node, and configured to control the third voltage line to be electrically coupled to the second node under the control of a second resetting signal from the second resetting line.

In at least one embodiment of the present disclosure, the first resetting line and the second resetting line may be the same or different.

In at least one embodiment of the present disclosure, the second resetting line is, but not limited to, a resetting line RST.

In a possible embodiment of the present disclosure, the third voltage line is, but not limited to, a second high voltage line.

During the implementation, the driving circuitry further includes the third resetting circuitry, and the second node is controlled by the third resetting circuitry to be electrically coupled to the third voltage line under the control of the resetting signal, so as to reset the potential at the second node.

In a possible embodiment of the present disclosure, the third resetting circuitry includes a ninth transistor and a tenth transistor. A gate electrode of the ninth transistor is electrically coupled to the second resetting line, a first electrode of the ninth transistor is electrically coupled to the third voltage line, and a second electrode of the ninth transistor is electrically coupled to a first electrode of the tenth transistor. A gate electrode of the tenth transistor is electrically coupled to the second resetting line, and a second electrode of the tenth transistor is electrically coupled to the second node.

The driving circuitry in the embodiments of the present disclosure further includes a second isolation circuitry electrically coupled to the second clock signal line, the third node and the second node, and configured to control the third node to be electrically coupled to the second node under the control of the second clock signal from the second clock signal line.

During the implementation, the driving circuitry further includes the second isolation circuitry, and the third node is controlled by the second isolation circuitry to be electrically coupled to the second node under the control of the second clock signal.

Figure 6:
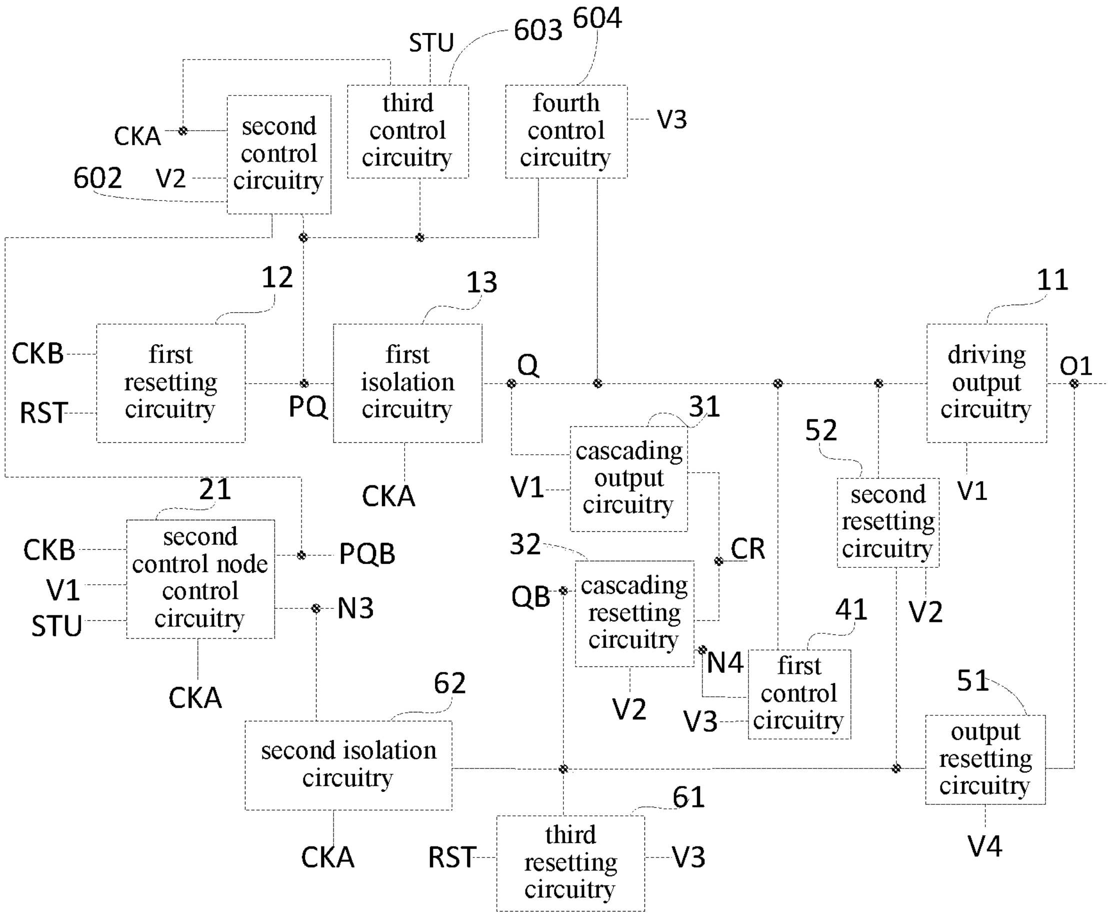
FIG. 6 is still yet another schematic view showing the driving circuitry according to one embodiment of the present disclosure.

As shown in FIG. 6, on the basis of the driving circuitry in FIG. 5, the driving circuitry further includes a second control circuitry 602, a third control circuitry 603, a fourth control circuitry 604, a third resetting circuitry 61 and a second isolation circuitry 62. The second control circuitry 602 is electrically coupled to the first control node PQ, the second clock signal line CKA, the second voltage line V2 and the second control node PQB, and configured to control the first control node PQ to be electrically coupled to the second voltage line V2 under the control of the potential at the second control node PQB and the second clock signal from the second clock signal line CKA. The third control circuitry 603 is electrically coupled to the second clock signal line CKA, the input line STU and the first control node PQ, and configured to control the input line STU to be electrically coupled to the first control node PQ under the control of the second clock signal CKA. The fourth control circuitry 604 is electrically coupled to the first node Q, the first control node PQ and the third voltage line V3, and configured to control the first control node PQ to be electrically coupled to the third voltage line V3 under the control of the potential at the first node Q. The second control node control circuitry 21 is further electrically coupled to the input line STU and the first clock signal line CKB, and configured to write the first clock signal from the first clock signal line CKB into the second control node PQB under the control of the input signal from the input line STU. The third resetting circuitry 61 is electrically coupled to the resetting line RST, the third voltage line V3 and the second node QB, and configured to control the third voltage line V3 to be electrically coupled to the second node QB under the control of the resetting signal from the resetting line RST. The second isolation circuitry 62 is electrically coupled to the second clock signal line CKA, the third node N3 and the second node QB, and configured to control the third node N3 to be electrically coupled to the second node QB under the control of the second clock signal from the second clock signal line CKA.

In a possible embodiment of the present disclosure, the third control circuitry includes an eleventh transistor, the second control circuitry includes a twelfth transistor and a thirteenth transistor, and the fourth control circuitry includes a fourteenth transistor. A gate electrode of the eleventh transistor is electrically coupled to the second clock signal line, a first electrode of the eleventh transistor is electrically coupled to the input line, and a second electrode of the eleventh transistor is electrically coupled to the first control node. A gate electrode of the fourteenth transistor is electrically coupled to the first node, a first electrode of the fourteenth transistor is electrically coupled to a third voltage line, and a second electrode of the fourteenth transistor is electrically coupled to the first control node. A gate electrode of the twelfth transistor is electrically coupled to the second clock signal line, a first electrode of the twelfth transistor is electrically coupled to the first control node, a second electrode of the twelfth transistor is electrically coupled to a first electrode of the thirteenth transistor, a gate electrode of the thirteenth transistor is electrically coupled to the second control node, and a second electrode of the thirteenth transistor is electrically coupled to the second voltage line, or the gate electrode of the twelfth transistor is electrically coupled to the second control node, the first electrode of the twelfth transistor is electrically coupled to the first control node, the second electrode of the twelfth transistor is electrically coupled to the first electrode of the thirteenth transistor, the gate electrode of the thirteenth transistor is electrically coupled to the second clock signal line, and the second electrode of the thirteenth transistor is electrically coupled to the second voltage line.

In a possible embodiment of the present disclosure, the driving output circuitry includes a fifteenth transistor and a second capacitor, and the first isolation circuitry includes a sixteenth transistor. A gate electrode of the fifteenth transistor is electrically coupled to the first node, a first electrode of the fifteenth transistor is electrically coupled to the first voltage line, and a second electrode of the fifteenth transistor is electrically coupled to the driving signal output end. A first end of the second capacitor is electrically coupled to the first node, and a second end of the second capacitor is electrically coupled to the driving signal output end. A control electrode of the sixteenth transistor is electrically coupled to the second clock signal line, a first electrode of the sixteenth transistor is electrically coupled to the first control node, and a second electrode of the sixteenth transistor is electrically coupled to the first node.

In a possible embodiment of the present disclosure, the second control node control circuitry includes a seventeenth transistor, a third capacitor and an eighteenth transistor. A gate electrode of the seventeenth transistor is electrically coupled to the first clock signal line, a first electrode of the seventeenth transistor is electrically coupled to the first voltage line, and a second electrode of the seventeenth transistor is electrically coupled to the second control node. A first end of the third capacitor is electrically coupled to the second control node, and a second end of the third capacitor is electrically coupled to the third node. A gate electrode of the eighteenth transistor is electrically coupled to the second control node, a first electrode of the eighteenth transistor is electrically coupled to the second clock signal line, and a second electrode of the eighteenth transistor is electrically coupled to the third node.

In a possible embodiment of the present disclosure, the cascading output circuitry includes a nineteenth transistor, a gate electrode of the nineteenth transistor is electrically coupled to the first node, a first electrode of the nineteenth transistor is electrically coupled to the first voltage line, and a second electrode of the nineteenth transistor is electrically coupled to a cascading output end.

In at least one embodiment of the present disclosure, the cascading output circuitry further includes a fourth capacitor, a first end of the fourth capacitor is electrically coupled to the first node, and a second end of the fourth capacitor is electrically coupled to the cascading output end.

In a possible embodiment of the present disclosure, the second isolation circuitry includes a twentieth transistor, a gate electrode of the twentieth transistor is electrically coupled to the second clock signal line, a first electrode of the twentieth transistor is electrically coupled to the third node, and a second electrode of the twentieth transistor is electrically coupled to the second node.

Figure 7:
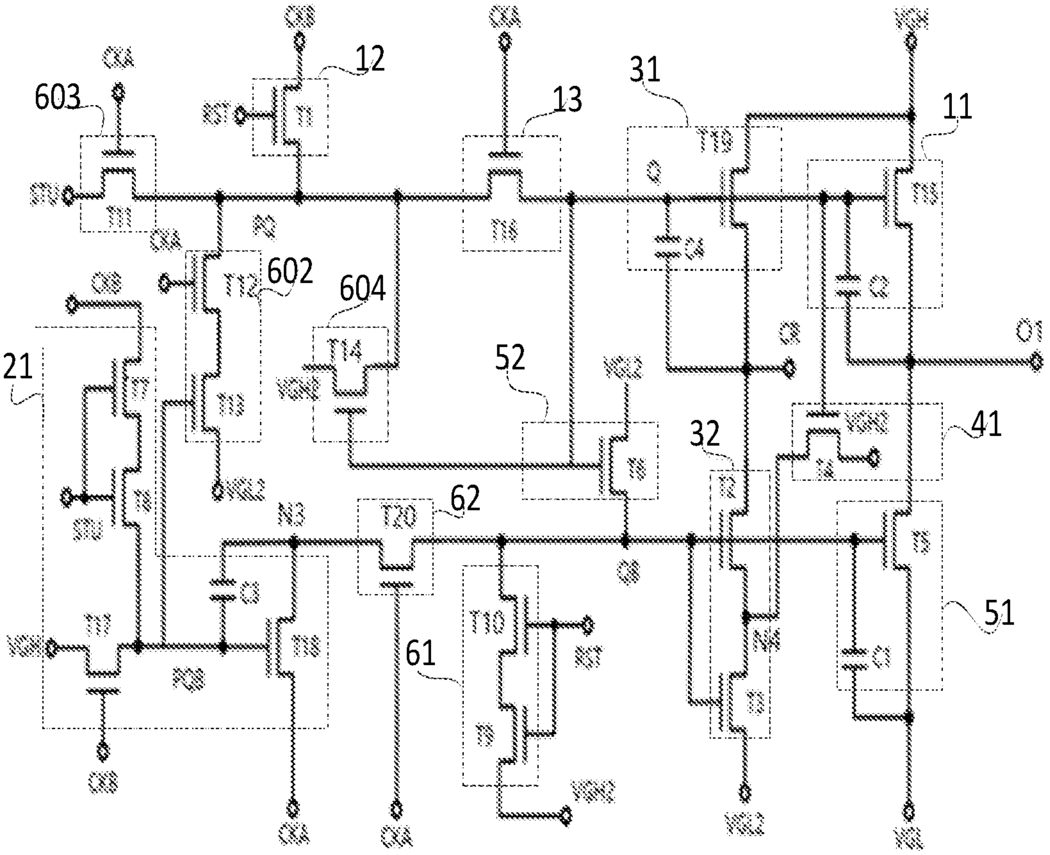
FIG. 7 is a circuit diagram of the driving circuitry according to one embodiment of the present disclosure.

As shown in FIG. 7, on the basis of the driving circuitry in FIG. 6, the first resetting circuitry 12 includes a first transistor T1, a gate electrode of the first transistor T1 is electrically coupled to the resetting line RST, a source electrode of the first transistor T1 is electrically coupled to the first clock signal line CKB, and a drain electrode of the first transistor T1 is electrically coupled to the first control node PQ.

The cascading resetting circuitry 32 includes a second transistor T2 and a third transistor T3. A gate electrode of the second transistor T2 is electrically coupled to the second node QB, a source electrode of the second transistor T2 is electrically coupled to the carry output end CR, and a drain electrode of the second transistor T2 is electrically coupled to the fourth node N4. A gate electrode of the third transistor T3 is electrically coupled to the second node QB, a source electrode of the third transistor T3 is electrically coupled to the fourth node N4, and a drain electrode of the third transistor T3 is electrically coupled to a second low voltage line VGL2.

The first control circuitry 41 includes a fourth transistor T4, a gate electrode of the fourth transistor T4 is electrically coupled to the first node Q, the source electrode of the fourth transistor T4 is electrically coupled to the second high voltage line VGH2, and the drain electrode of the fourth transistor T4 is electrically coupled to the fourth node N4.

The output resetting circuitry 51 includes a fifth transistor T5 and a first capacitor C1, and the second resetting circuitry 52 includes a sixth transistor T6. A gate electrode of the fifth transistor T5 is electrically coupled to the second node QB, the source electrode of the fifth transistor T5 is electrically coupled to the driving signal output end O1, and the drain electrode of the fifth transistor T5 is electrically coupled to the first low voltage line VGL. A first end of the first capacitor C1 is electrically coupled to the second node QB, and a second end of the first capacitor C1 is electrically coupled to the first low voltage line VGL. A gate electrode of the sixth transistor T6 is electrically coupled to the first node Q, a source electrode of the sixth transistor T6 is electrically coupled to the second low voltage line VGL2, and a drain electrode of the sixth transistor T6 is electrically coupled to the second node QB.

The second control node control circuitry 21 includes a seventh transistor T7 and an eighth transistor T8. A gate electrode of the seventh transistor T7 is electrically coupled to the input line STU, a source electrode of the seventh transistor T7 is electrically coupled to the first clock signal line CKB, and a drain electrode of the seventh transistor T7 is electrically coupled to a source electrode of the eighth transistor T8. A gate electrode of the eighth transistor T8 is electrically coupled to the input line STU, and a drain electrode of the eighth transistor T8 is electrically coupled to the second control node PQB.

The third resetting circuitry 61 includes a ninth transistor T9 and a tenth transistor T10. A gate electrode of the ninth transistor T9 is electrically coupled to the resetting line RST, a source electrode of the ninth transistor T9 is electrically coupled to a second high voltage line VGH2, and a drain electrode of the ninth transistor T9 is electrically coupled to a source electrode of the tenth transistor T10. A gate electrode of the tenth transistor T10 is electrically coupled to the resetting line RST, and a drain electrode of the tenth transistor T10 is electrically coupled to the second node QB.

The third control circuitry 603 includes an eleventh transistor T11, the second control circuitry 602 includes a twelfth transistor T12 and a thirteenth transistor T13, and the fourth control circuitry 604 includes a fourteenth transistor T14. A gate electrode of the eleventh transistor T11 is electrically coupled to the second clock signal line CKA, a source electrode of the eleventh transistor T11 is electrically coupled to the input line STU, and a drain electrode of the eleventh transistor T11 is electrically coupled to the first control node PQ. A gate electrode of the fourteenth transistor T14 is electrically coupled to the first node Q, a source electrode of the fourteenth transistor T14 is electrically coupled to the second high voltage line VGH2, and a drain electrode of the fourteenth transistor T14 is electrically coupled to the first control node PQ. A gate electrode of the twelfth transistor T12 is electrically coupled to the second clock signal line CKA, a source electrode of the twelfth transistor T12 is electrically coupled to the first control node PQ, and a drain electrode of the twelfth transistor T12 is electrically coupled to a source electrode of the thirteenth transistor T13. A gate electrode of the thirteenth transistor T13 is electrically coupled to the second control node PQB, and a drain electrode of the thirteenth transistor T13 is electrically coupled to the second low voltage line VGL2.

The driving output circuitry 11 includes a fifteenth transistor T15 and a second capacitor C2, and the first isolation circuitry 13 includes a sixteenth transistor T16. A gate electrode of the fifteenth transistor T15 is electrically coupled to the first node Q, a source electrode of the fifteenth transistor T15 is electrically coupled to the first high voltage line VGH, and a drain electrode of the fifteenth transistor T15 is electrically coupled to the driving signal output end O1. A first end of the second capacitor C2 is electrically coupled to the first node Q, and a second end of the second capacitor C2 is electrically coupled to the driving signal output end O1. A gate electrode of the sixteenth transistor T16 is electrically coupled to the second clock signal line CKA, a source electrode of the sixteenth transistor T16 is electrically coupled to the first control node PQ, and a drain electrode of the sixteenth transistor is electrically coupled to the first node Q.

The second control node control circuitry 21 further includes a seventeenth transistor T17, a third capacitor C3 and an eighteenth transistor T18. A gate electrode of the seventeenth transistor T17 is electrically coupled to the first clock signal line CKB, a source electrode of the seventeenth transistor T17 is electrically coupled to the first high voltage line VGH, and a drain electrode of the seventeenth transistor T17 is electrically coupled to the second control node PQB. A first end of the third capacitor C3 is electrically coupled to the second control node PQB, and a second end of the third capacitor C3 is electrically coupled to the third node N3. A gate electrode of the eighteenth transistor T18 is electrically coupled to the second control node PQB, a source electrode of the eighteenth transistor T18 is electrically coupled to the second clock signal line CKA, and a drain electrode of the eighteenth transistor T18 is electrically coupled to the third node N3.

The cascading output circuitry 31 includes a nineteenth transistor T19, a gate electrode of the nineteenth transistor T19 is electrically coupled to the first node Q, a source electrode of the nineteenth transistor T19 is electrically coupled to the first high voltage line VGH, and a drain electrode of the nineteenth transistor T19 is electrically coupled to the cascading output end CR.

The cascade output circuitry 31 further includes a fourth capacitor C4, a first end of the fourth capacitor C4 is electrically coupled to the first node Q, and a second end of the fourth capacitor C4 is electrically coupled to the cascading output end CR.

The second isolation circuitry 62 includes a twentieth transistor T20, a gate electrode of the twentieth transistor T20 is electrically coupled to the second clock signal line CKA, a source electrode of the twentieth transistor T20 is electrically coupled to the third node N3, and a drain electrode of the twentieth transistor T20 is electrically coupled to the second node QB.

In the driving circuitry in FIG. 7, all of the transistors are, but not limited to, n-type oxide transistors.

In the driving circuitry in FIG. 7, C4 is provided to increase the anti-interference capability.

In the driving circuitry in FIG. 7, the second control node control circuitry includes the seventh transistor T7, the eighth transistor T8, the seventeenth transistor T17, the third capacitor C3 and the eighteenth transistor T18. The drain electrode of T17 is electrically coupled to the gate electrode of T13 in the second control circuitry, and the drain electrode of T18 is electrically coupled to T20. The drain electrode of T18 is electrically coupled to the second node QB through T20, and the drain electrode of T18 is electrically coupled to the gate electrode of T2, the gate electrode of T3 and the electrode of T5.

In at least one embodiment of the present disclosure, the driving circuitry includes, but not limited to, n-type transistors. In actual use, the driving circuitry may also include p-type transistors.

Figure 8:
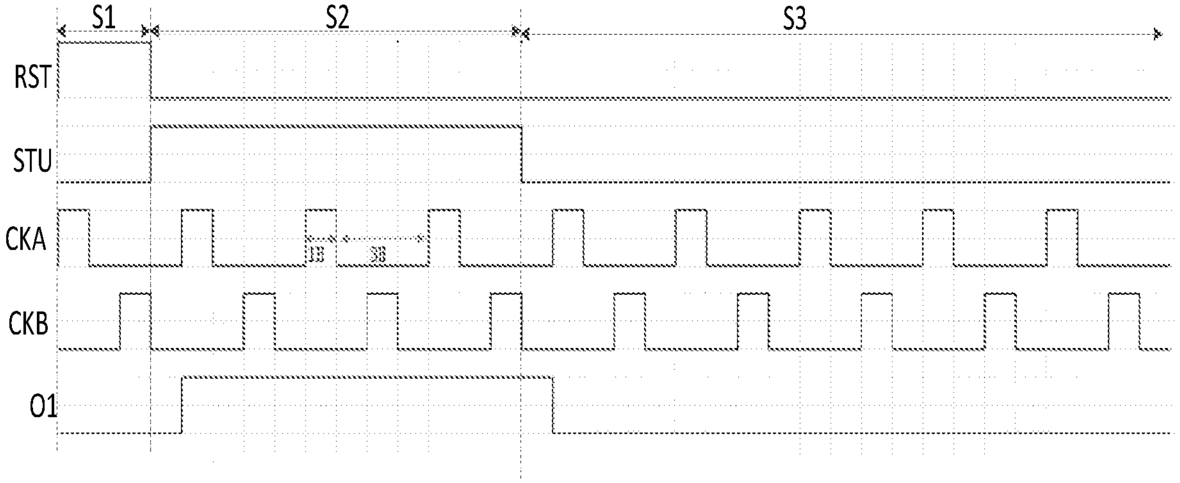
FIG. 8 is a sequence diagram of the driving circuitry in FIG. 7.

As shown in FIG. 8, during the operation of the driving circuitry in FIG. 7, a drive period includes a first phase S1, a second phase S2 and a third phase S3 arranged one after another.

Within the first phase S1, RST provides a high voltage signal so as to turn on T1. For PQ, when CKB outputs a high voltage signal, the potential at PQ is pulled up. The potential of the second clock signal from CKA is a low voltage and T16 is turned off, so the potential at the first node Q is not pulled up. When CKB outputs a low voltage signal and CKA outputs a high voltage signal, T16 is turned on, and at this time, the potential at PQ and the potential at Q are both pulled down, so as to reset the potential at the first node Q. The potential at PQ changes periodically along with the potential of the first clock signal from CKB, so the low voltage time period is short, and the leakage current is small. In addition, the potential at PQ is reset through T1, so as to further reduce the risk of current leakage.

Within the first phase S1, RST provides a high voltage signal, so as to turn on T9 and T10. QB is electrically coupled to VGH2. VGH2 outputs a second high voltage signal for a long time period, so no current leakage occurs. When CKB outputs a high voltage, T17 is turned on, and the potential at PQB is a high voltage. Due to the presence of C3, the potential at PQB is maintained as a high voltage. When CKA outputs a high voltage signal, the potential at PQB is further pulled up due to bootstrapping, and changes periodically with a change in the potential of the second clock signal from the CKA.

Within the second phase S2, STU provides a high voltage signal and RST provides a low voltage signal. When CKA provides a high voltage signal, T11, T16, T15 and T19 are turned on, the potential at PQ and the potential at Q are high voltages. Each of CR and O1 outputs a high voltage signal, T7 and T8 are turned on, and the potential at PQB changes with a change in the potential of the first clock signal from the CKB. T6 is turned on, and QB is electrically coupled to VGL2.

Within the third phase S3, STU provides a low voltage signal. When CKA outputs a high voltage signal, T11 is turned on, PQ is electrically coupled to STU, and the potential at PQ is a low voltage. T16 is turned on and PQ is electrically coupled to Q, so that the potential at the first node Q is a low voltage. When CKA outputs a high voltage signal, the potential at PQB is pulled up due to bootstrapping, and T20 is turned on. The potential at QB is a high voltage so as to turn on T5 and T2. CR outputs a second low voltage signal, and O1 outputs a low voltage signal.

As shown in FIG. 8, the driving signal outputted by the driving circuitry in FIG. 7 through the driving signal output end is a compensation control signal.

In the driving circuitry in FIG. 7, the potential of the first low voltage signal from VGL is −6 V, and the potential of the second low voltage signal from VGL2 is −8 V. When O1 outputs a high voltage signal, a gate-to-source voltage of T11 is −2 V, so it is able to prevent the occurrence of current leakage when the negative drift occurs for the threshold voltage of T11.

As shown in FIG. 8, a duty ratio of the first clock signal from CKA and a duty ratio of the second clock signal from CKB are, but not limited to, 25%, and a phase of the second clock signal is separated from a phase of the first clock signal by, but not limited to, half a period.

Figure 9:
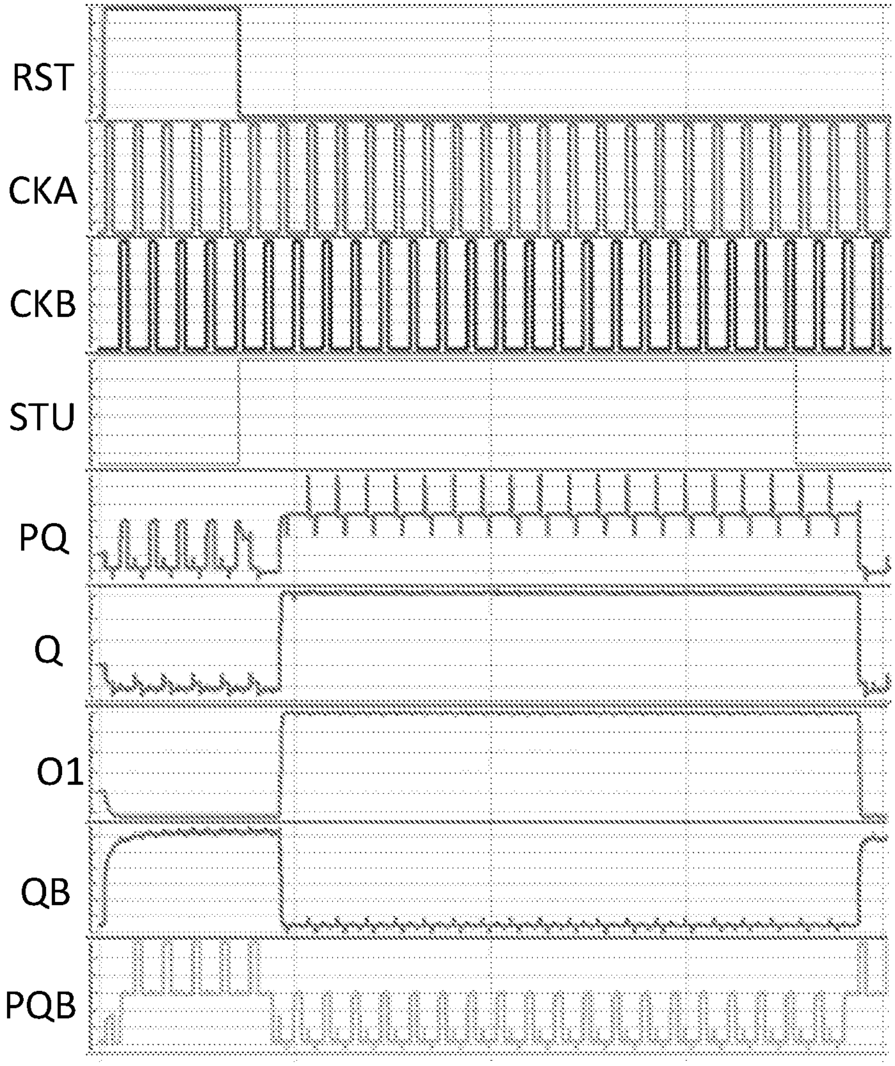
FIG. 9 is a simulated sequence diagram of the driving circuitry in FIG. 7 when a threshold voltage of an oxide transistor is 4 V.

FIG. 9 is a simulated sequence diagram of the driving circuitry in FIG. 7 when a threshold voltage of the oxide transistor is 4 V.

Figure 10:
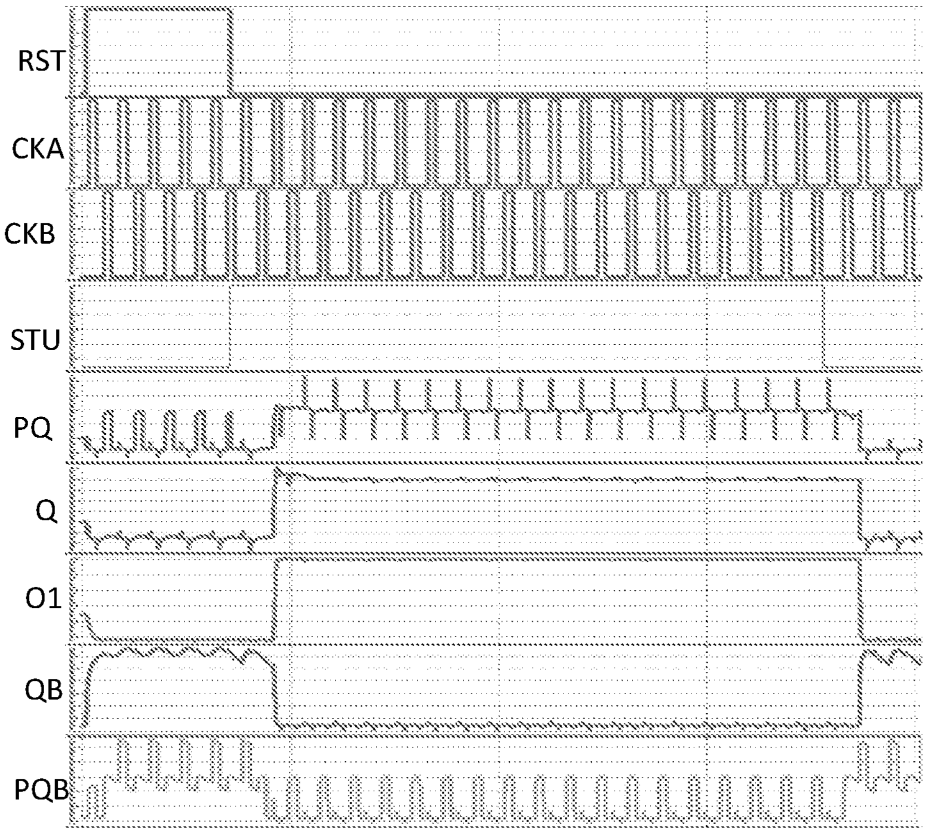
FIG. 10 is a simulated sequence diagram of the driving circuitry in FIG. 7 when the threshold voltage of the oxide transistor is −2.5 V.

FIG. 10 is a simulated sequence diagram of the driving circuitry in FIG. 7 when the threshold voltage of the oxide transistor is −2.5 V.

As shown in FIG. 10, the driving circuitry in FIG. 7 operates normally when the threshold voltage of the oxide transistor is −2.5V.

Figure 11:
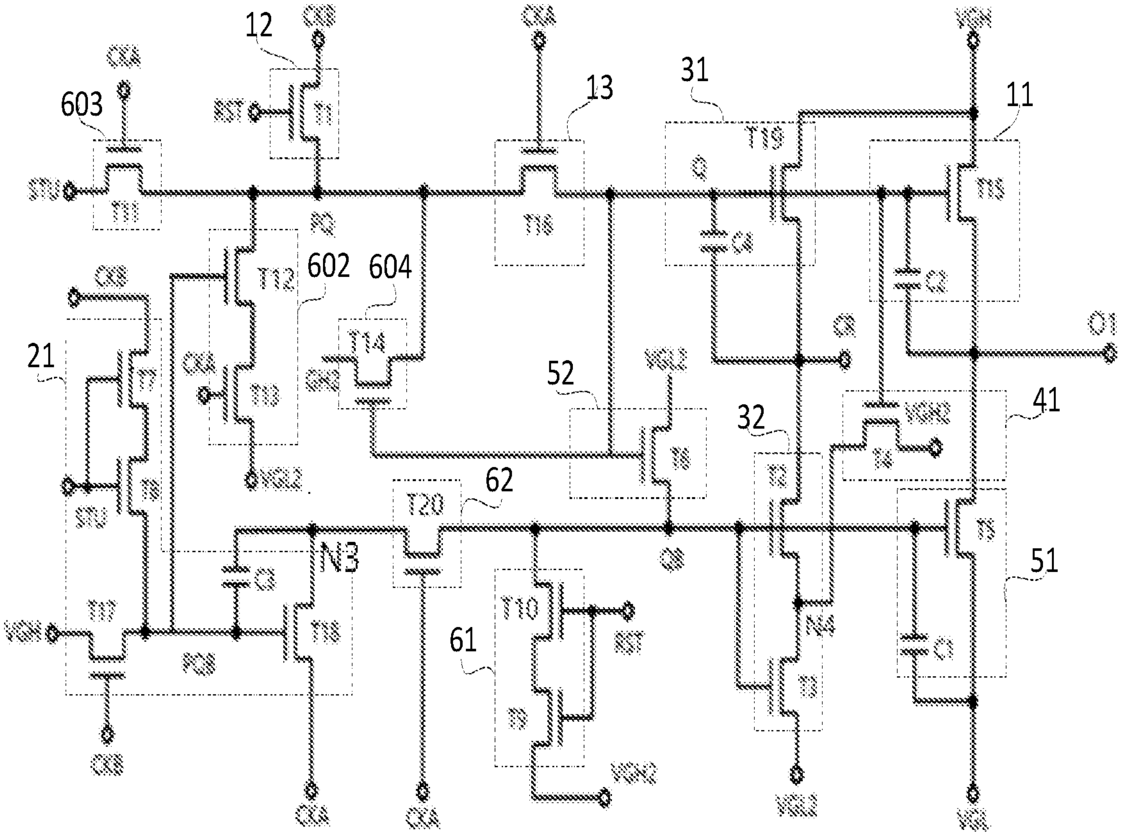
FIG. 11 is another circuit diagram of the driving circuitry according to one embodiment of the present disclosure.

The driving circuitry in FIG. 11 differs from that in FIG. 7 in that the gate electrode of T12 is electrically coupled to PQB, and the gate electrode of T13 is electrically coupled to the second clock signal line CKB.

Figure 12:
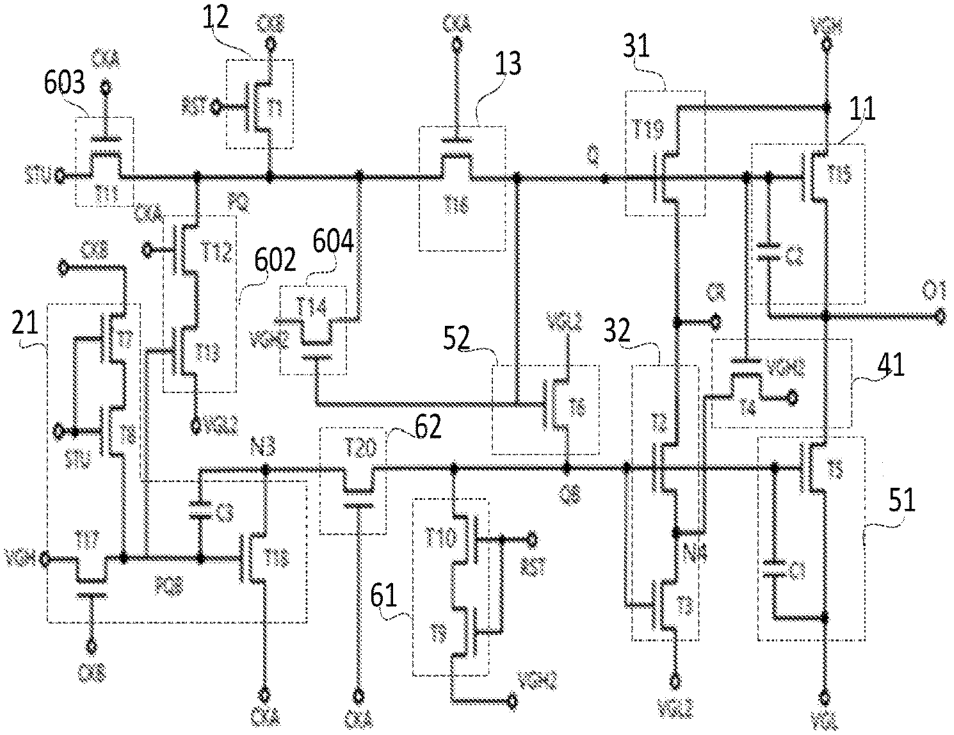
FIG. 12 is yet another circuit diagram of the driving circuitry according to one embodiment of the present disclosure.

The driving circuitry in FIG. 12 differs from that in FIG. 7 in that C4 is not provided.

Figure 13:
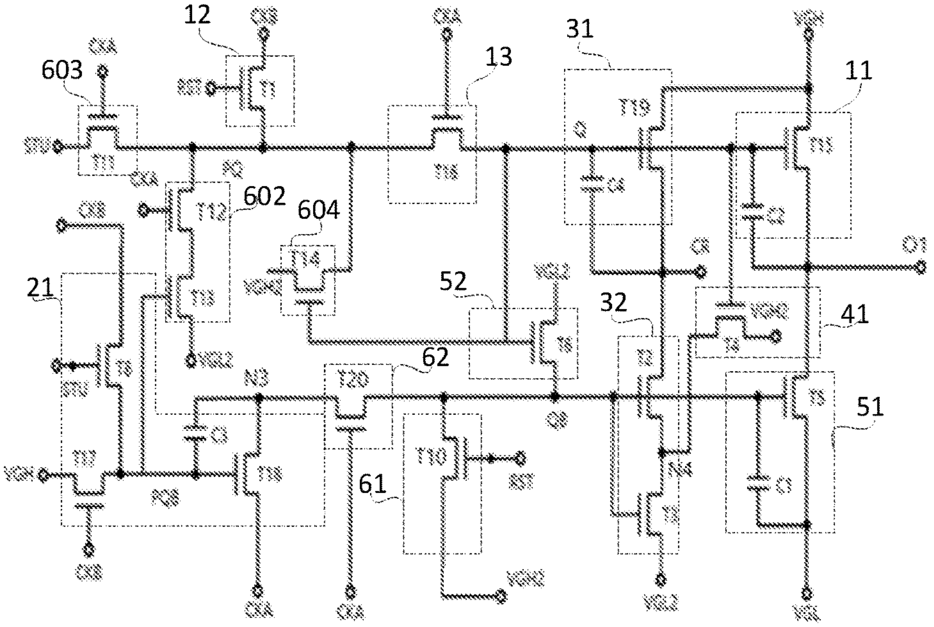
FIG. 13 is still yet another circuit diagram of the driving circuitry according to one embodiment of the present disclosure.

The driving circuitry in FIG. 13 differs from that in FIG. 7 in that T7 and T9 are not provided.

Figure 14:
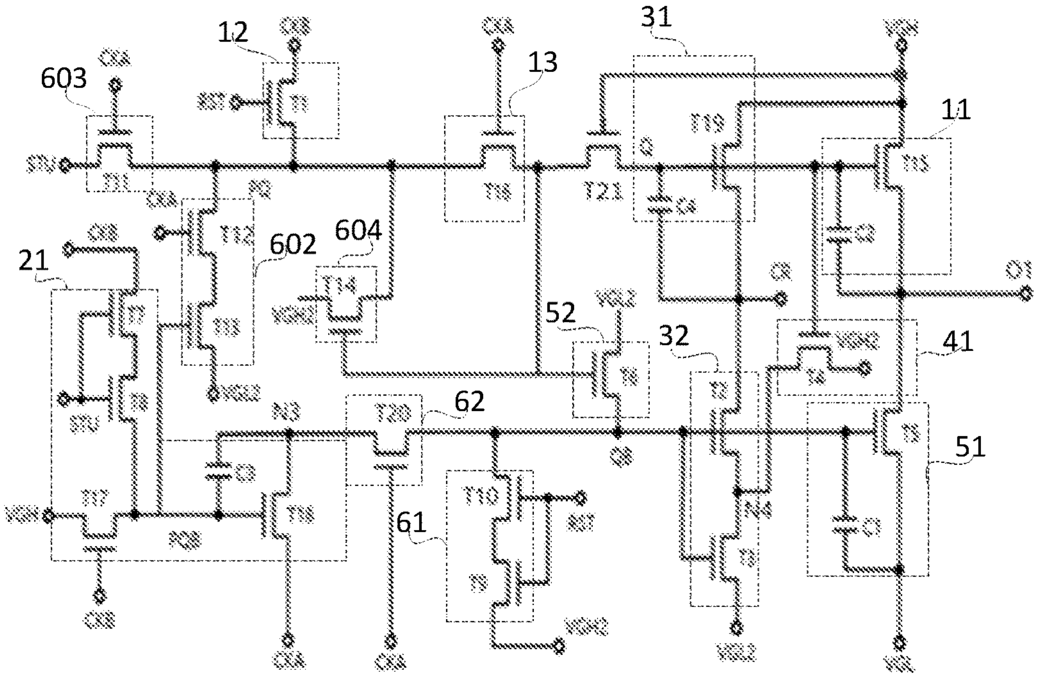
FIG. 14 is still yet another circuit diagram of the driving circuitry according to one embodiment of the present disclosure.

The driving circuitry in FIG. 14 differs from that in FIG. 7 in that the driving circuitry further includes the twenty-first transistor T21, the gate electrode of the twenty-first transistor T21 is electrically coupled to the first high voltage line VGH, the source electrode of the twenty-first transistor T21 is electrically coupled to the drain electrode of T16, and the drain electrode of the twenty-first transistor T21 is electrically coupled to the first node Q. The twenty-first transistor T2 is a normally-on transistor.

Figure 15:
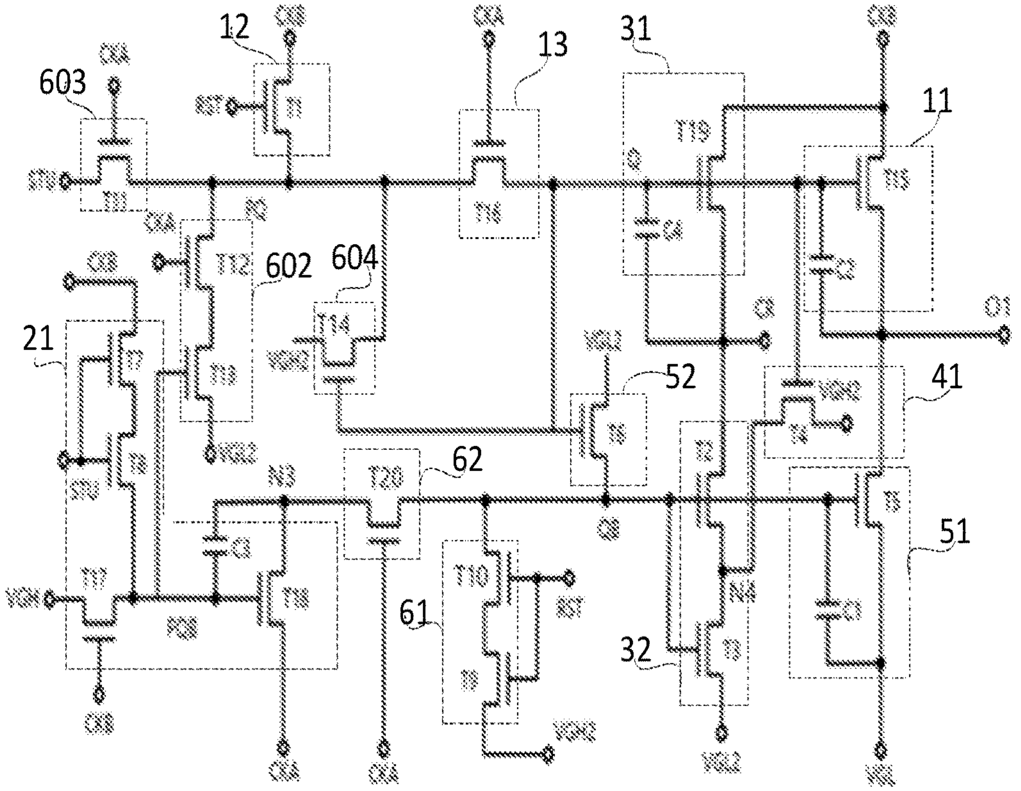
FIG. 15 is still yet another circuit diagram of the driving circuitry according to one embodiment of the present disclosure.

The driving circuitry in FIG. 15 differs from that in FIG. 7 in that the source electrode of T15 is electrically coupled to the first clock signal line CKB.

Figure 16:
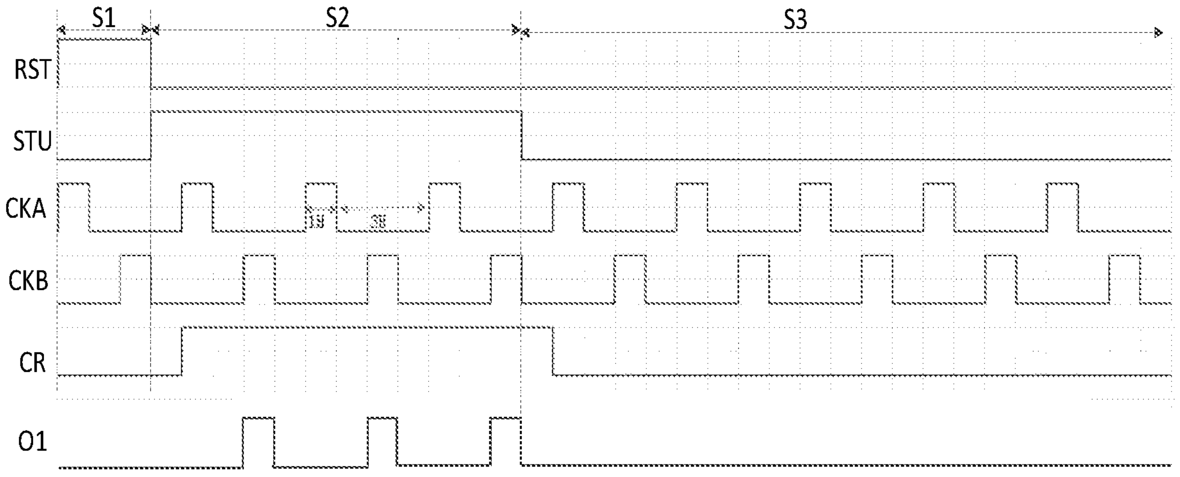
FIG. 16 is a sequence diagram of the driving circuitry in FIG. 15.
Figure 17:
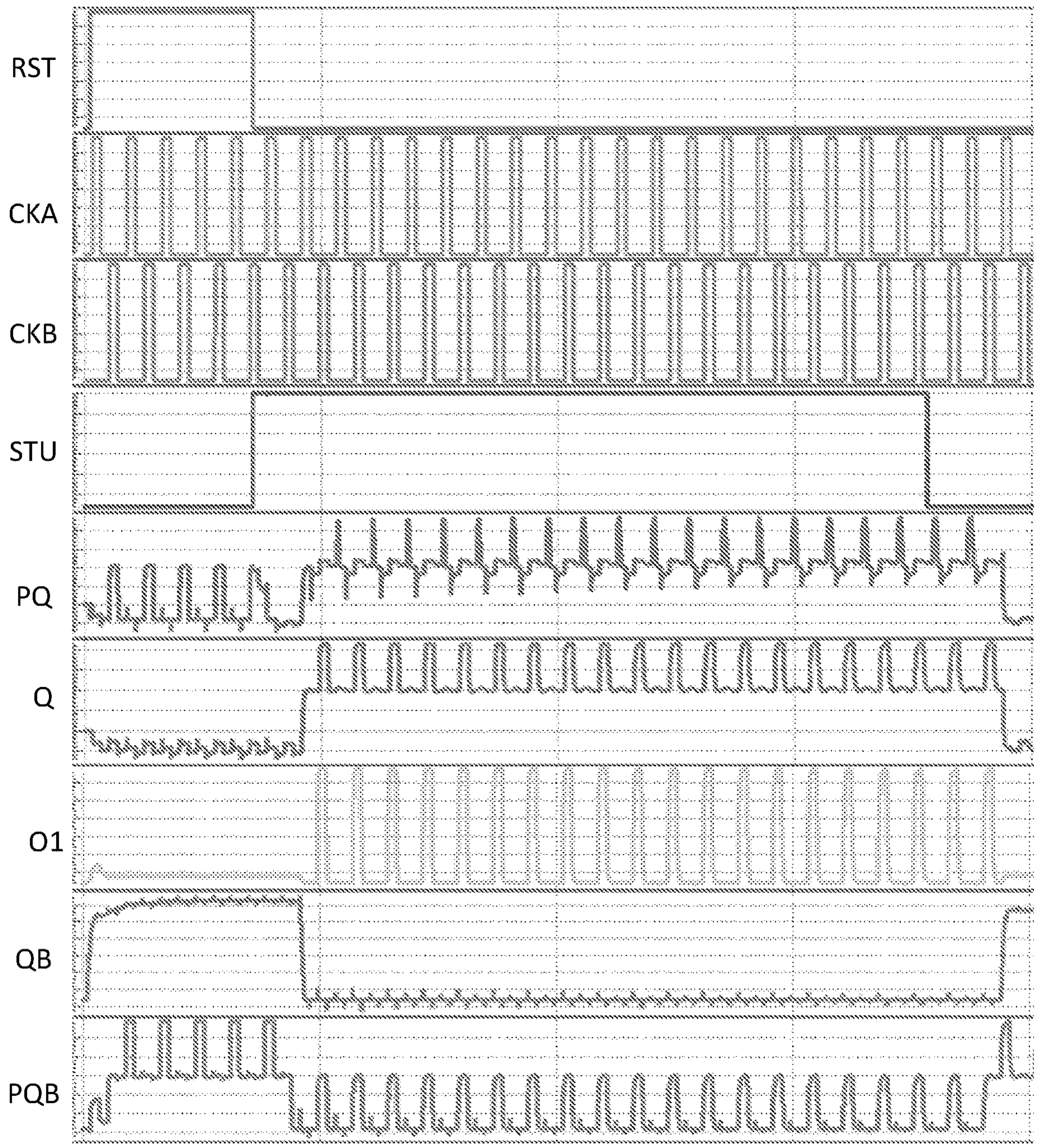
FIG. 17 is a simulated sequence diagram of the driving circuitry in FIG. 15.

FIG. 16 is a sequence diagram of the driving circuitry in FIG. 15, and FIG. 17 is a simulated sequence diagram of the driving circuitry in FIG. 15.

The driving circuitry in FIG. 15 is configured to, but not limited to, apply a gate driving signal to a pixel unit.

In the driving circuitry in FIG. 15, the driving output circuitry further includes at least two transistors for outputting. For example, apart from the fifteenth transistor, the driving output circuitry further includes at least one output transistor, a source electrode of the output transistor is electrically coupled to a corresponding clock signal output end, and a drain electrode of the output transistor is electrically coupled to a corresponding driving signal output end. At this time, the driving circuitry includes at least two driving signal output ends. A corresponding gate driving signal can be output to the at least two driving signal output ends configured to apply gate driving signals to pixel units in at least two rows.

The present disclosure further provides in some embodiments a driving method for the above-mentioned driving circuitry. A display period includes a first phase, a second phase and a third phase arranged one after another. The driving method includes: within the first phase, controlling, by the first resetting circuitry, the first clock signal line to write the first clock signal into the first control node under the control of the first resetting signal from the first resetting line, and when the second clock signal line provides a high voltage signal, controlling, by the first isolation circuitry, the first control node to be electrically coupled to the first node under the control of the second clock signal from the second clock signal line; within the second phase, when the second clock signal line provides a high voltage signal, controlling, by the first isolation circuitry, the first control node to be electrically coupled to the first node under the control of the second clock signal, and controlling, by the driving output circuitry, the driving signal output end to be electrically coupled to the first voltage line under the control of the potential at the first node; and within the third phase, when the second clock signal line provides a high voltage signal, controlling, by the first isolation circuitry, the first control node to be electrically coupled to the first node under the control of the second clock signal.

The present disclosure further provides in some embodiments a display substrate including the above-mentioned driving circuitry.

The display substrate further includes a plurality of direct-current signal lines arranged in columns, a display region and a peripheral region, and the direct-current signal lines and the driving circuitry are arranged in the peripheral region. The direct-current signal lines in at least one column are arranged on a side of the driving circuitry away from the display region, and the direct-current signal lines other than the direct-current signal lines in the at least one column are arranged on a side of the driving circuitry close to the display region.

Figure 18:
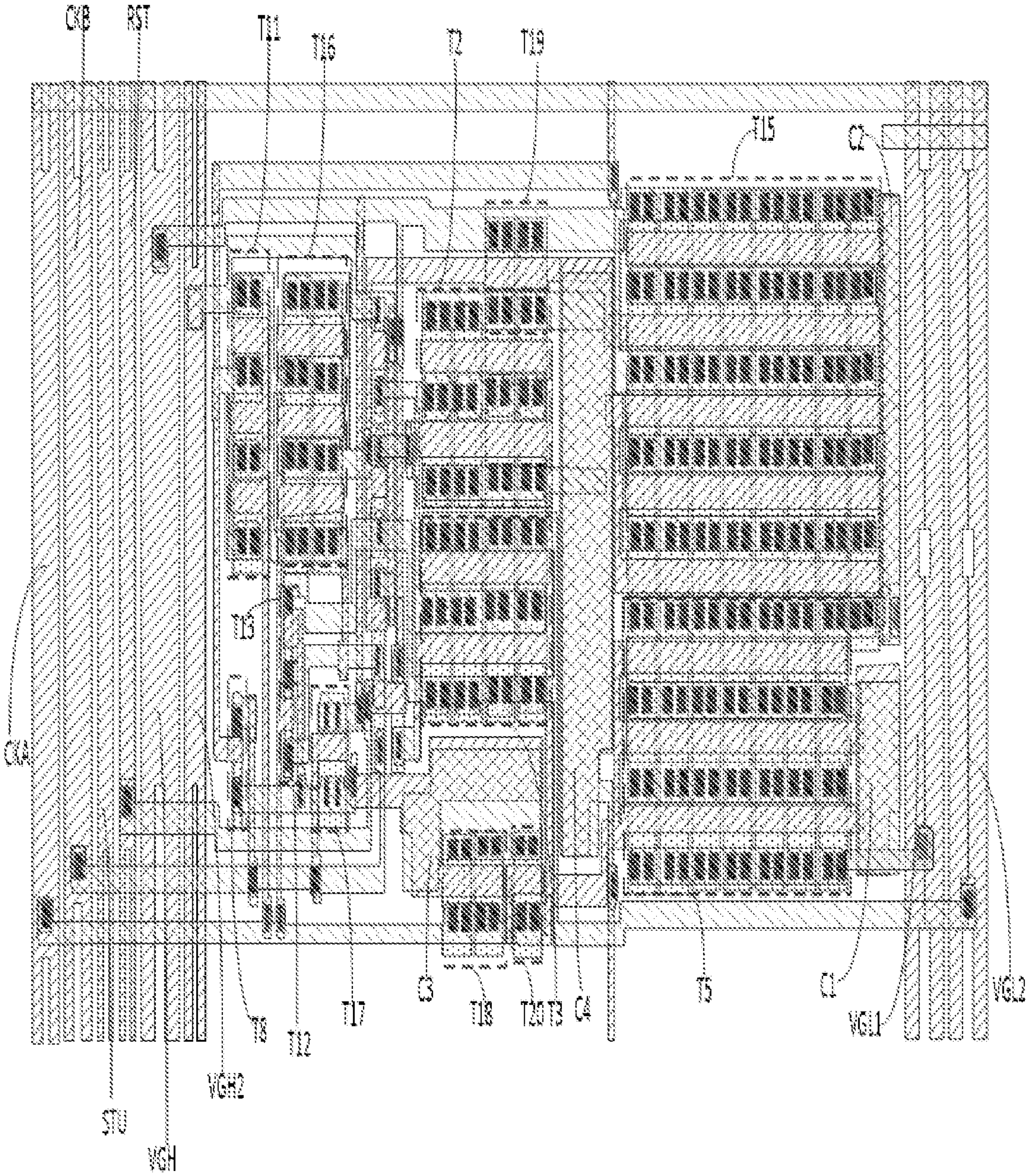
FIG. 18 is a schematic view showing the layout of the driving circuitry in FIG. 13.
Figure 19A:
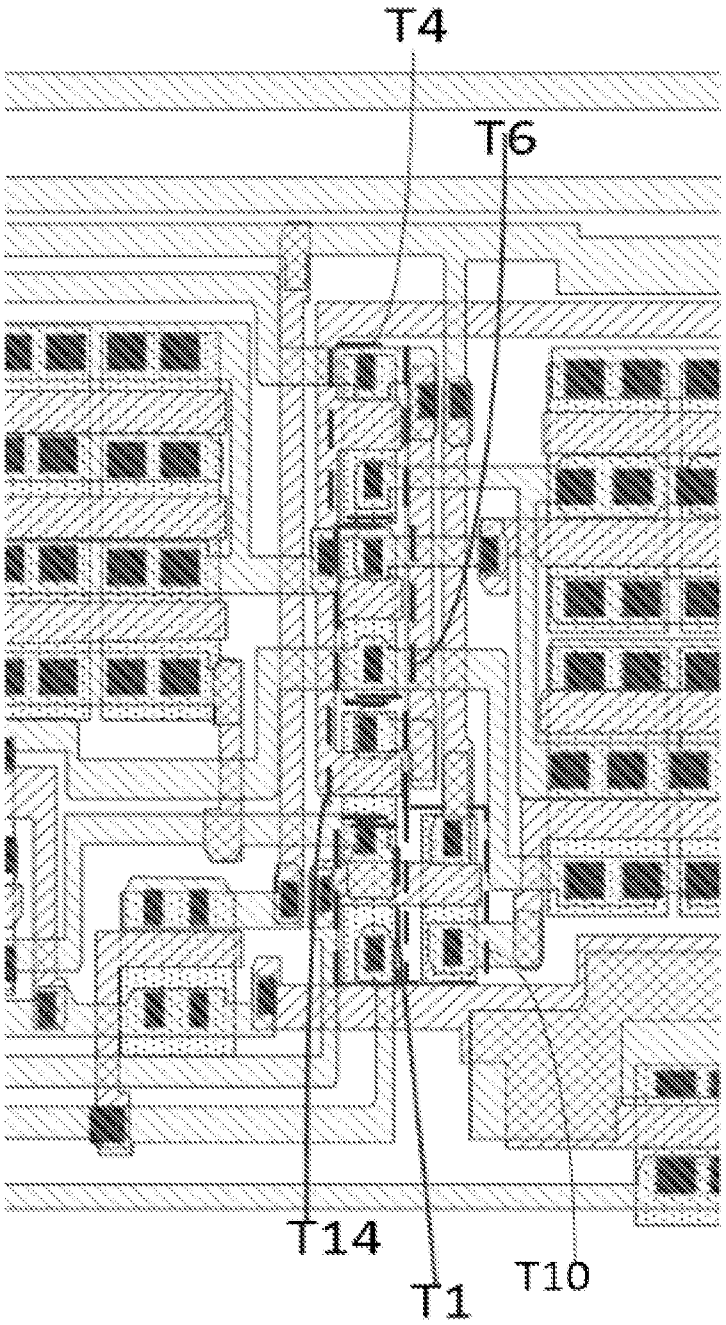
FIG. 19A is a partially enlarged view of the driving circuitry in FIG. 18.
Figure 19B:
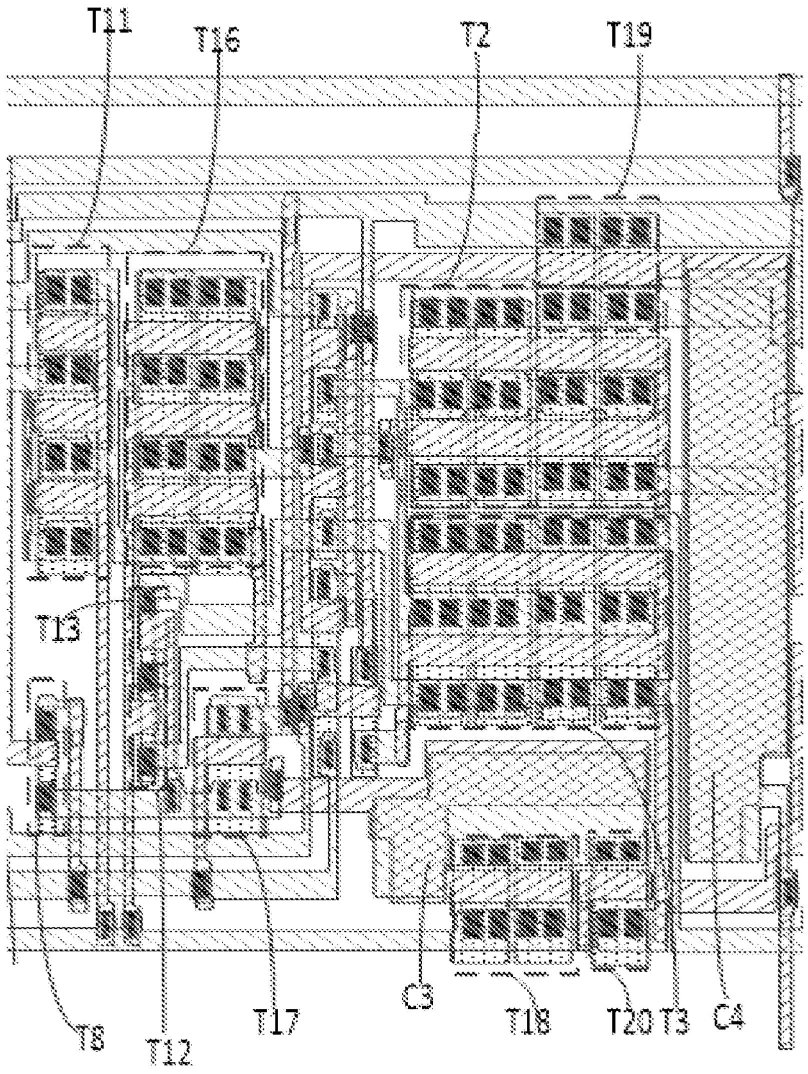
FIG. 19B is another partially enlarged view of the driving circuitry in FIG. 18.
Figure 20:
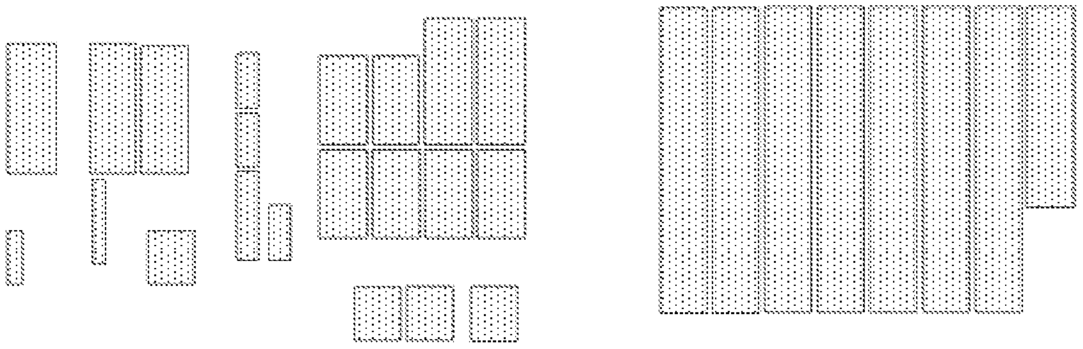
FIG. 20 is a schematic view showing the layout of a semiconductor layer in FIG. 18.
Figure 21:
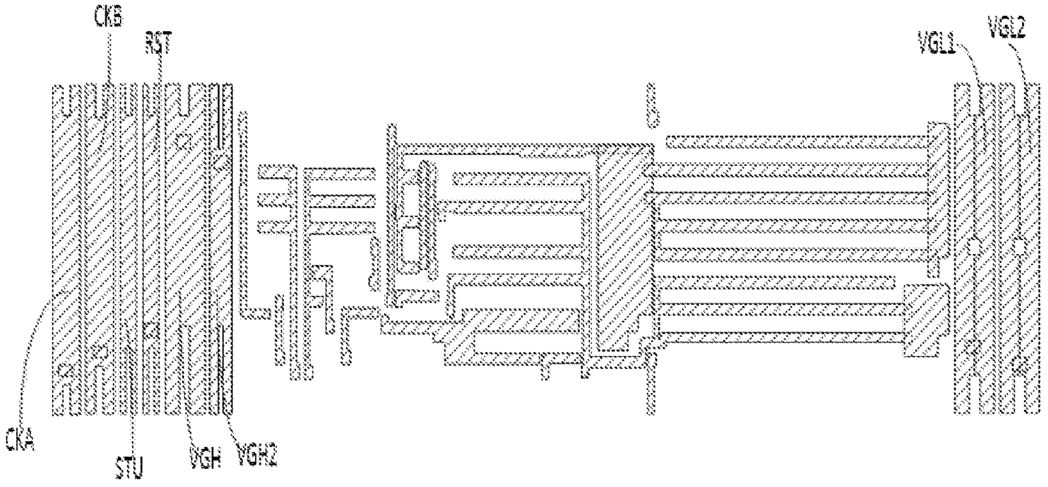
FIG. 21 is a schematic view showing the layout of a gate metal layer in FIG. 18.
Figure 22:
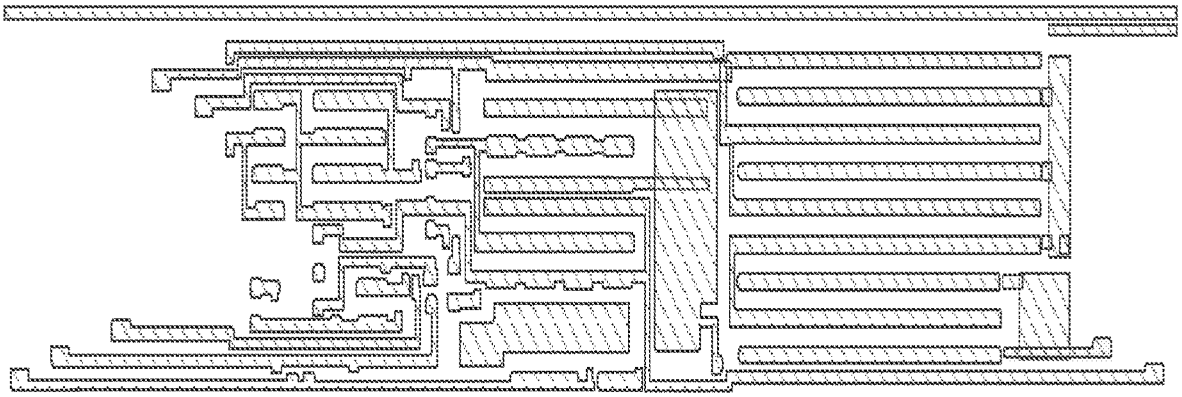
FIG. 22 is a schematic view showing the layout of a source/drain metal layer in FIG. 18.

FIG. 18 is a schematic view showing the layout of the driving circuitry in FIG. 13, FIGS. 19A and 19B are enlarged views of the driving circuitry in FIG. 18, FIG. 20 is a schematic view showing the layout of a semiconductor layer in FIG. 18, FIG. 21 is a schematic view showing the layout of a gate metal layer in FIG. 18, and FIG. 22 is a schematic view showing the layout of a source/drain metal layer in FIG. 18.

As shown in FIG. 18, CKA, CKB, STU, RST, VGH and VGH2 extend in a vertical direction, and VGL1 and VGL2 extend in the vertical direction. CKA, CKB, STU, RST, VGH and VGH2 are arranged on a side of the driving circuitry away from the display region, and VGL1 and VGL2 are arranged on a side of the driving circuitry close to the display region.

As shown in FIG. 18, a plate of the fourth capacitor C4 extends in the vertical direction, an area of the plate of the fourth capacitor C4 is larger than an area of a plate of the first capacitor C1, an area of a plate of C2, and an area of a plate of C3.

The present disclosure further provides in some embodiments a display device including the above-mentioned display substrate.

The display device may be any product or member having a display function, e.g., mobile phone, tablet computer, television, display, laptop computer, digital photo frame or navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A driving circuitry, comprising a driving output circuitry, a first resetting circuitry, a first isolation circuitry, a cascading output circuitry and a cascading resetting circuitry, wherein the driving output circuitry is electrically coupled to a first node and a driving signal output end, electrically coupled to a first voltage line or a first clock signal line, and configured to control the driving signal output end to be electrically coupled to the first voltage line or the first clock signal line under the control of a potential at the first node;

the first resetting circuitry is electrically coupled to a first resetting line, the first clock signal line and a first control node, and configured to control the first clock signal line to write a first clock signal into the first control node under the control of a first resetting signal from the first resetting line; and the first isolation circuitry is electrically coupled to a second clock signal line, the first control node and the first node, and configured to control the first control node to be electrically coupled to the first node under the control of a second clock signal from the second clock signal line;

wherein the cascading output circuitry is electrically coupled to the first node, a carry output end and the first voltage line, and configured to control the carry output end to be electrically coupled to the first voltage line under the control of the potential at the first node, and the cascading resetting circuitry is electrically coupled to a second node, the carry output end and a second voltage line, and configured to control the carry output end to be electrically coupled to the second voltage line under the control of a potential at the second node;

wherein the cascading resetting circuitry comprises a second transistor and a third transistor;

a gate electrode of the second transistor is electrically coupled to the second node, a first electrode of the second transistor is electrically coupled to the carry output end, and a second electrode of the second transistor is electrically coupled to a fourth node; and a gate electrode of the third transistor is electrically coupled to the second node, a first electrode of the third transistor is electrically coupled to the fourth node, and a second electrode of the third transistor is electrically coupled to the second voltage line.

2. The driving circuitry according to claim 1, wherein the first resetting circuitry comprises a first transistor, a gate electrode of the first transistor is electrically coupled to the first resetting line, a first electrode of the first transistor is electrically coupled to the first clock signal line, and a second electrode of the first transistor is electrically coupled to the first control node.

3. The driving circuitry according to claim 2, wherein the first transistor is an oxide thin film transistor, a first high voltage time period does not overlap with a second high voltage time period, the first high voltage time period is a time period within which a potential of the first clock signal is a high voltage, and the second high voltage time period is a time period within which a potential of the second clock signal is a high voltage.

4. The driving circuitry according to claim 1, further comprising a second control node control circuitry coupled to the first clock signal line, the first voltage line, a second control node, a third node and the second clock signal line, and configured to control the second control node to be electrically coupled to the first voltage line under the control of the first clock signal, and control the third node to be electrically coupled to the second clock signal line under the control of a potential at the second control node, wherein the second control node control circuitry is further configured to control the potential at the second control node in accordance with a potential at the third node.

5. The driving circuitry according to claim 1, further comprising a first control circuitry electrically coupled to the first node, a third voltage line and the fourth node, and configured to control the third voltage line to be electrically coupled to the fourth node under the control of the potential at the first node, wherein the first control circuitry comprises a fourth transistor, a gate electrode of the fourth transistor is electrically coupled to the first node, a first electrode of the fourth transistor is electrically coupled to the third voltage line, and a second electrode of the fourth transistor is electrically coupled to the fourth node.

6. The driving circuitry according to claim 5, further comprising a driving output resetting circuitry and a second resetting circuitry, wherein the output resetting circuitry is electrically coupled to the second node, the driving signal output end and a fourth voltage line, and configured to control the driving signal output end to be electrically coupled to the fourth voltage line under the control of the potential at the second node, wherein the second resetting circuitry is electrically coupled to the first node, the second voltage line and the second node, and configured to control the second voltage line to be electrically coupled to the second node under the control of the potential at the first node, wherein a transistor in the output resetting circuitry is an oxide transistor, and a voltage value of a second voltage signal from the second voltage line is less than a voltage value of a first voltage signal from the first voltage line, wherein the output resetting circuitry comprises a fifth transistor and a first capacitor, and the second resetting circuitry comprises a sixth transistor;

a gate electrode of the fifth transistor is electrically coupled to the second node, a first electrode of the fifth transistor is electrically coupled to the driving signal output end, and a second electrode of the fifth transistor is electrically coupled to the fourth voltage line;

a first end of the first capacitor is electrically coupled to the second node, and a second end of the first capacitor is electrically coupled to the fourth voltage line; and a gate electrode of the sixth transistor is electrically coupled to the first node, a first electrode of the sixth transistor is electrically coupled to the second voltage line, and a second electrode of the sixth transistor is electrically coupled to the second node.

7. The driving circuitry according to claim 1, further comprising a second control circuitry electrically coupled to the first control node, the second clock signal line, the second voltage line and a second control node, and configured to control the first control node to be electrically coupled to the second voltage line under the control of the potential at the second control node and the second clock signal from the second clock signal line, wherein the driving circuitry further comprises a third control circuitry electrically coupled to the second clock signal line, an input line and the first control node, and configured to control the input line to be electrically coupled to the first control node under the control of the second clock signal, wherein the driving circuitry further comprises a fourth control circuitry electrically coupled to the first node, the first control node and the third voltage line, and configured to control the first control node to be electrically coupled to the third voltage line under the control of the potential at the first node.

8. The driving circuitry according to claim 6, wherein the second control node control circuitry is further electrically coupled to the input line, and configured to write the first clock signal into the second control node under the control of an input signal from the input line, wherein the second control node control circuitry comprises a seventh transistor and an eighth transistor;

a gate electrode of the seventh transistor is electrically coupled to the input line, a first electrode of the seventh transistor is electrically coupled to the first clock signal line, and a second electrode of the seventh transistor is electrically coupled to a first electrode of the eighth transistor; and a gate electrode of the eighth transistor is electrically coupled to the input line, and a second electrode of the eighth transistor is electrically coupled to the second control node.

9. The driving circuitry according to claim 8, further comprising a third resetting circuitry electrically coupled to the second resetting line, the third voltage line, and the second node, and configured to control the third voltage line to be electrically coupled to the second node under the control of a second resetting signal from the second resetting line, wherein the third resetting circuitry comprises a ninth transistor and a tenth transistor;

a gate electrode of the ninth transistor is electrically coupled to the second resetting line, a first electrode of the ninth transistor is electrically coupled to the third voltage line, and a second electrode of the ninth transistor is electrically coupled to a first electrode of the tenth transistor; and a gate electrode of the tenth transistor is electrically coupled to the second resetting line, and a second electrode of the tenth transistor is electrically coupled to the second node.

10. The driving circuitry according to claim 4, further comprising a second isolation circuitry electrically coupled to the second clock signal line, the third node and the second node, and configured to control the third node to be electrically coupled to the second node under the control of a second clock signal from the second clock signal line.

11. The driving circuitry according to claim 5, wherein the third control circuitry comprises an eleventh transistor, the second control circuitry comprises a twelfth transistor and a thirteenth transistor, and the fourth control circuitry comprises a fourteenth transistor;

a gate electrode of the eleventh transistor is electrically coupled to the second clock signal line, a first electrode of the eleventh transistor is electrically coupled to the input line, and a second electrode of the eleventh transistor is electrically coupled to the first control node;

a gate electrode of the fourteenth transistor is electrically coupled to the first node, a first electrode of the fourteenth transistor is electrically coupled to a third voltage line, and a second electrode of the fourteenth transistor is electrically coupled to the first control node;

a gate electrode of the twelfth transistor is electrically coupled to the second clock signal line, a first electrode of the twelfth transistor is electrically coupled to the first control node, a second electrode of the twelfth transistor is electrically coupled to a first electrode of the thirteenth transistor, a gate electrode of the thirteenth transistor is electrically coupled to the second control node, and a second electrode of the thirteenth transistor is electrically coupled to the second voltage line, or the gate electrode of the twelfth transistor is electrically coupled to the second control node, the first electrode of the twelfth transistor is electrically coupled to the first control node, the second electrode of the twelfth transistor is electrically coupled to the first electrode of the thirteenth transistor, the gate electrode of the thirteenth transistor is electrically coupled to the second clock signal line, and the second electrode of the thirteenth transistor is electrically coupled to the second voltage line.

12. The driving circuitry according to claim 11, wherein the driving output circuitry comprises a fifteenth transistor and a second capacitor, and the first isolation circuitry comprises a sixteenth transistor;

a gate electrode of the fifteenth transistor is electrically coupled to the first node, a first electrode of the fifteenth transistor is electrically coupled to the first voltage line or the first clock signal line, and a second electrode of the fifteenth transistor is electrically coupled to the driving signal output end;

a first end of the second capacitor is electrically coupled to the first node, and a second end of the second capacitor is electrically coupled to the driving signal output end; and a control electrode of the sixteenth transistor is electrically coupled to the second clock signal line, a first electrode of the sixteenth transistor is electrically coupled to the first control node, and a second electrode of the sixteenth transistor is electrically coupled to the first node.

13. The driving circuitry according to claim 12, wherein the second control node control circuitry comprises a seventeenth transistor, a third capacitor and an eighteenth transistor;

a gate electrode of the seventeenth transistor is electrically coupled to the first clock signal line, a first electrode of the seventeenth transistor is electrically coupled to the first voltage line, and a second electrode of the seventeenth transistor is electrically coupled to the second control node;

a first end of the third capacitor is electrically coupled to the second control node, and a second end of the third capacitor is electrically coupled to the third node; and a gate electrode of the eighteenth transistor is electrically coupled to the second control node, a first electrode of the eighteenth transistor is electrically coupled to the second clock signal line, and a second electrode of the eighteenth transistor is electrically coupled to the third node.

14. The driving circuitry according to claim 1, wherein the cascading output circuitry comprises a nineteenth transistor, a gate electrode of the nineteenth transistor is electrically coupled to the first node, a first electrode of the nineteenth transistor is electrically coupled to the first voltage line, and a second electrode of the nineteenth transistor is electrically coupled to a cascading output end, wherein the cascading output circuitry further comprises a fourth capacitor, a first end of the fourth capacitor is electrically coupled to the first node, and a second end of the fourth capacitor is electrically coupled to the cascading output end.

15. The driving circuitry according to claim 10, wherein the second isolation circuitry comprises a twentieth transistor, a gate electrode of the twentieth transistor is electrically coupled to the second clock signal line, a first electrode of the twentieth transistor is electrically coupled to the third node, and a second electrode of the twentieth transistor is electrically coupled to the second node.

16. The driving circuitry according to claim 12, wherein the driving circuitry further comprises a twenty-first transistor, a gate electrode of the twenty-first transistor is electrically coupled to the first high voltage line, a first electrode of the twenty-first transistor is electrically coupled to the second electrode of the sixteenth transistor, and a second electrode of the twenty-first transistor is electrically coupled to the first node.

17. A driving method for a driving circuitry, wherein a display period comprises a first phase, a second phase and a third phase arranged one after another;

wherein the driving circuitry comprises a driving output circuitry, a first resetting circuitry and a first isolation circuitry, wherein the driving output circuitry is electrically coupled to a first node and a driving signal output end, electrically coupled to a first voltage line or a first clock signal line, and configured to control the driving signal output end to be electrically coupled to the first voltage line or the first clock signal line under the control of a potential at the first node;

the first resetting circuitry is electrically coupled to a first resetting line, the first clock signal line and a first control node, and configured to control the first clock signal line to write a first clock signal into the first control node under the control of a first resetting signal from the first resetting line; and the first isolation circuitry is electrically coupled to a second clock signal line, the first control node and the first node, and configured to control the first control node to be electrically coupled to the first node under the control of a second clock signal from the second clock signal line;

wherein the cascading output circuitry is electrically coupled to the first node, a carry output end and the first voltage line, and configured to control the carry output end to be electrically coupled to the first voltage line under the control of the potential at the first node, and the cascading resetting circuitry is electrically coupled to a second node, the carry output end and a second voltage line, and configured to control the carry output end to be electrically coupled to the second voltage line under the control of a potential at the second node;

wherein the cascading resetting circuitry comprises a second transistor and a third transistor;

a gate electrode of the second transistor is electrically coupled to the second node, a first electrode of the second transistor is electrically coupled to the carry output end, and a second electrode of the second transistor is electrically coupled to a fourth node; and a gate electrode of the third transistor is electrically coupled to the second node, a first electrode of the third transistor is electrically coupled to the fourth node, and a second electrode of the third transistor is electrically coupled to the second voltage line, the driving method comprising:

within the first phase, controlling, by the first resetting circuitry, the first clock signal line to write the first clock signal into the first control node under the control of the first resetting signal from the first resetting line, and when the second clock signal line provides a high voltage signal, controlling, by the first isolation circuitry, the first control node to be electrically coupled to the first node under the control of the second clock signal from the second clock signal line;

within the second phase, when the second clock signal line provides a high voltage signal, controlling, by the first isolation circuitry, the first control node to be electrically coupled to the first node under the control of the second clock signal, and controlling, by the driving output circuitry, the driving signal output end to be electrically coupled to the first voltage line under the control of the potential at the first node; and within the third phase, when the second clock signal line provides a high voltage signal, controlling, by the first isolation circuitry, the first control node to be electrically coupled to the first node under the control of the second clock signal.

18. A display substrate comprising the driving circuitry according to claim 1, wherein the display substrate further comprises a plurality of direct-current signal lines arranged in columns, a display region and a peripheral region, wherein the direct-current signal lines and the driving circuitry are arranged in the peripheral region, the direct-current signal lines in at least one column are arranged on a side of the driving circuitry away from the display region, and the direct-current signal lines other than the direct-current signal lines in the at least one column are arranged on a side of the driving circuitry close to the display region.

19. A display device comprising the display substrate according to claim 18.

20. A driving circuitry, comprising a driving output circuitry, a first resetting circuitry, a first isolation circuitry and a second control node control circuitry, wherein the driving output circuitry is electrically coupled to a first node and a driving signal output end, electrically coupled to a first voltage line or a first clock signal line, and configured to control the driving signal output end to be electrically coupled to the first voltage line or the first clock signal line under the control of a potential at the first node;

the first resetting circuitry is electrically coupled to a first resetting line, the first clock signal line and a first control node, and configured to control the first clock signal line to write a first clock signal into the first control node under the control of a first resetting signal from the first resetting line; and the first isolation circuitry is electrically coupled to a second clock signal line, the first control node and the first node, and configured to control the first control node to be electrically coupled to the first node under the control of a second clock signal from the second clock signal line, wherein the second control node control circuitry is coupled to the first clock signal line, the first voltage line, a second control node, a third node and the second clock signal line, and configured to control the second control node to be electrically coupled to the first voltage line under the control of the first clock signal, and control the third node to be electrically coupled to the second clock signal line under the control of a potential at the second control node, wherein the second control node control circuitry is further configured to control the potential at the second control node in accordance with a potential at the third node, wherein the second control node control circuitry is further electrically coupled to the input line, and configured to write the first clock signal into the second control node under the control of an input signal from the input line, wherein the second control node control circuitry comprises a seventh transistor and an eighth transistor;

a gate electrode of the seventh transistor is electrically coupled to the input line, a first electrode of the seventh transistor is electrically coupled to the first clock signal line, and a second electrode of the seventh transistor is electrically coupled to a first electrode of the eighth transistor; and a gate electrode of the eighth transistor is electrically coupled to the input line, and a second electrode of the eighth transistor is electrically coupled to the second control node.

* * * * *